US 10,463,547 B2

(12) United States Patent
Kano et al.

(10) Patent No.: US 10,463,547 B2
(45) Date of Patent: Nov. 5, 2019

(54) COMPACT ELECTRIC VEHICLE

(71) Applicants: TOYODA IRON WORKS CO., LTD., Toyota-shi, Aichi (JP); NATIONAL INSTITUTE FOR ENVIRONMENTAL STUDIES, Tsukuba-shi, Ibaraki (JP); ACCURATE SYSTEMS INC., Tokyo (JP)

(72) Inventors: Mitsutoshi Kano, Toyota (JP); Yoshinori Kondo, Tsukuba (JP); Junichi Yasu, Higashikurume (JP)

(73) Assignees: TOYODA IRON WORKS CO., LTD., Toyota (JP); NATIONAL INSTITUTE FOR ENVIRONMENTAL STUDIES, Tsukuba (JP); ACCURATE SYSTEMS INC., Tokyo (JP)

(*) Notice: Subject to any disclaimer, the term of this patent is extended or adjusted under 35 U.S.C. 154(b) by 0 days.

(21) Appl. No.: 16/056,715

(22) Filed: Aug. 7, 2018

(65) Prior Publication Data
US 2018/0338877 A1 Nov. 29, 2018

Related U.S. Application Data

(63) Continuation of application No. PCT/JP2016/075054, filed on Aug. 26, 2016.

(30) Foreign Application Priority Data

Feb. 10, 2016 (JP) ................................ 2016-023304

(51) Int. Cl.
*B60K 1/02* (2006.01)
*A61G 5/04* (2013.01)
(Continued)

(52) U.S. Cl.
CPC ............... *A61G 5/047* (2013.01); *A61G 5/10* (2013.01); *B62K 5/025* (2013.01); *B62K 15/00* (2013.01);
(Continued)

(58) Field of Classification Search
CPC .......... A61G 5/047; A61G 5/10; B62K 15/00; B62K 5/025; B62K 2202/00; B62L 3/02; B60K 7/0007
(Continued)

(56) References Cited

U.S. PATENT DOCUMENTS 5,207,286 A * 5/1993 McKelvey ............. A61G 5/047
180/13
5,351,774 A 10/1994 Okamoto
(Continued)

FOREIGN PATENT DOCUMENTS

CA 2 487 630 A1 5/2005
CA 2 487 630 C 8/2012
(Continued)

OTHER PUBLICATIONS

Oct. 18, 2016 International Search Report issued in International Patent Application No. PCT/JP2016/075054.
(Continued)

*Primary Examiner* — Toan C To
(74) *Attorney, Agent, or Firm* — Oliff PLC

(57) ABSTRACT

The purpose of the present disclosure is to provide a small-sized electric vehicle that is capable of assisting power of a wheelchair coupled to the small-sized electric vehicle, and that is capable of traveling alone in a state of being detached from the wheelchair. A folding vehicle 1 is capable of making a wheelchair 101 coupled by a coupling member 61 move in a self-traveling manner using a battery 14 and an in-wheel motor M etc. Furthermore, the folding vehicle 1 is
(Continued)

capable of self-traveling by using the battery 14 and the in-wheel motor M etc. while in an independent state of not being coupled to the wheelchair 101.

10 Claims, 23 Drawing Sheets

(51) Int. Cl.
| | |
|---|---|
| *B62K 5/025* | (2013.01) |
| *B62K 15/00* | (2006.01) |
| *A61G 5/10* | (2006.01) |
| *B62L 3/02* | (2006.01) |
| *B60K 7/00* | (2006.01) |

(52) U.S. Cl.
CPC ............. *B62L 3/02* (2013.01); *B60K 7/0007* (2013.01); *B62K 2202/00* (2013.01)

(58) Field of Classification Search
USPC .......... 280/33.991, 33.992, 33.993; 180/210, 180/214, 11, 907
See application file for complete search history.

(56) References Cited

U.S. PATENT DOCUMENTS

| | | | | |
|---|---|---|---|---|
| 5,494,126 A * | 2/1996 | Meeker | ............... | A61G 5/047 180/13 |
| 7,174,093 B2 * | 2/2007 | Kidd | ............... | A61G 5/047 180/58 |
| 7,967,095 B2 | 6/2011 | Kosco et al. | | |
| 8,113,305 B1 * | 2/2012 | Flowers | ............... | A61G 5/045 180/19.1 |
| 8,165,718 B2 | 4/2012 | Ota et al. | | |
| 8,430,189 B2 * | 4/2013 | Tallino | ............... | A61G 5/047 180/11 |
| 8,960,340 B2 * | 2/2015 | Tallino | ............... | A61G 5/047 180/11 |
| 9,227,687 B2 | 1/2016 | Delgatty et al. | | |
| 9,522,711 B2 | 12/2016 | Kosco et al. | | |
| 9,694,868 B2 | 7/2017 | Delgatty et al. | | |
| 10,143,604 B2 * | 12/2018 | Day, Jr. | ............... | A61G 3/061 |
| 2004/0000440 A1 * | 1/2004 | Sawyer | ............... | A61G 5/047 180/13 |
| 2006/0000664 A1 * | 1/2006 | Huang | ............... | A61G 5/047 180/198 |
| 2007/0051548 A1 | 3/2007 | Kosco et al. | | |
| 2011/0095508 A1 * | 4/2011 | Chiu | ............... | A61G 5/047 280/304.1 |
| 2012/0029697 A1 | 2/2012 | Ota | | |
| 2012/0175856 A1 | 7/2012 | Ellis | | |
| 2015/0068828 A1 | 3/2015 | Delgatty et al. | | |

FOREIGN PATENT DOCUMENTS

| | | |
|---|---|---|
| EP | 3 246 235 A1 | 11/2017 |
| JP | 3051905 U | 9/1998 |
| JP | H10-243505 A | 9/1998 |
| JP | 2001-341647 A | 12/2001 |
| JP | 2006-000589 A | 1/2006 |
| JP | 2011-087728 A | 5/2011 |
| JP | 2012-56363 A | 3/2012 |
| JP | 5425587 B2 | 2/2014 |
| JP | 2015-128921 A | 7/2015 |
| JP | 6206189 B2 | 10/2017 |

OTHER PUBLICATIONS

Aug. 14, 2018 International Preliminary Report on Patentability issued in International Patent Application No. PCT/JP2016/075054.
Aug. 5, 2019 Office Action issued in Chinese Patent Application No. 201680081439.
Sep. 6, 2019 Extended European Search Report issued in European Patent Application No. 16889875.

* cited by examiner

COMPACT ELECTRIC VEHICLE

CROSS-REFERENCE TO RELATED APPLICATION

This application is based upon and claims the benefit of priority of the prior Japanese Patent Application No. 2016-023304, filed on Feb. 10, 2016, the entire contents of which are incorporated herein by reference.

FIELD

The present disclosure relates to a small-sized electric vehicle capable of assisting power of a wheelchair.

BACKGROUND

Conventionally, various techniques for assisting power of a wheelchair have been suggested. For example, a travelling assisting device for a wheelchair disclosed in Japanese Laid-open Patent Publication No. 2006-589 comprises a travelling device body and a mounting assisting tool, wherein the travelling device body includes a frame provided with a wheel, a pedal, a saddle, and a rotational force transmission mechanism, and the mounting assisting tool for the wheelchair is separately provided. The travelling assisting device for the wheelchair is characterized by comprising a combination of the above travelling device body and mounting assisting tool.

In order to travel with the travelling assisting device for the wheelchair, a user gets in the wheelchair, a caregiver sits down on the saddle as if he/she always gets on a bicycle and pedals with a handle of the wheelchair gripped. Then, the wheel goes round and the wheelchair is pushed to be able to travel forward. When the wheelchair stops, the wheelchair can be safely stopped by gripping a brake lever. Since the travelling device body can change an angle to left or right with respect to the wheelchair, the caregiver can change a travelling direction by turning the gripped handle to the right and left.

SUMMARY

According to an aspect of the embodiments, a small-sized electric vehicle includes: an electric mechanism that is capable of making the small-sized electric vehicle alone self-travel; and a coupling member that is coupled a wheelchair to the small-sized electric vehicle.

The object and advantages of the invention will be realized and attained by means of the elements and combinations particularly pointed out in the claims.

It is to be understood that both the forgoing general description and the following detailed description are exemplary and explanatory and are not restrictive of the invention.

DESCRIPTION OF EMBODIMENTS

Since an above-mentioned background technique forms a main part by combining the travelling device body including the wheel etc. with the mounting assisting tool for mounting the travelling device body on the wheelchair, it has been difficult that the travelling device body that was detached from the wheelchair and being in an independent state is made to travel.

The present disclosure is made in the context of circumstances mentioned above, and an object thereof is to provide a small-sized electric vehicle that is capable of assisting power of a wheelchair coupled to the small-sized electric vehicle, and that is capable of traveling alone in a state of being detached from the wheelchair.

A folding vehicle according to the present disclosure is described with reference to the drawings.

1. Folding Vehicle

Firstly, a basic configuration of the folding vehicle according to the present embodiment is described with reference to FIG. 1 to FIG. 6.

Figure 2:
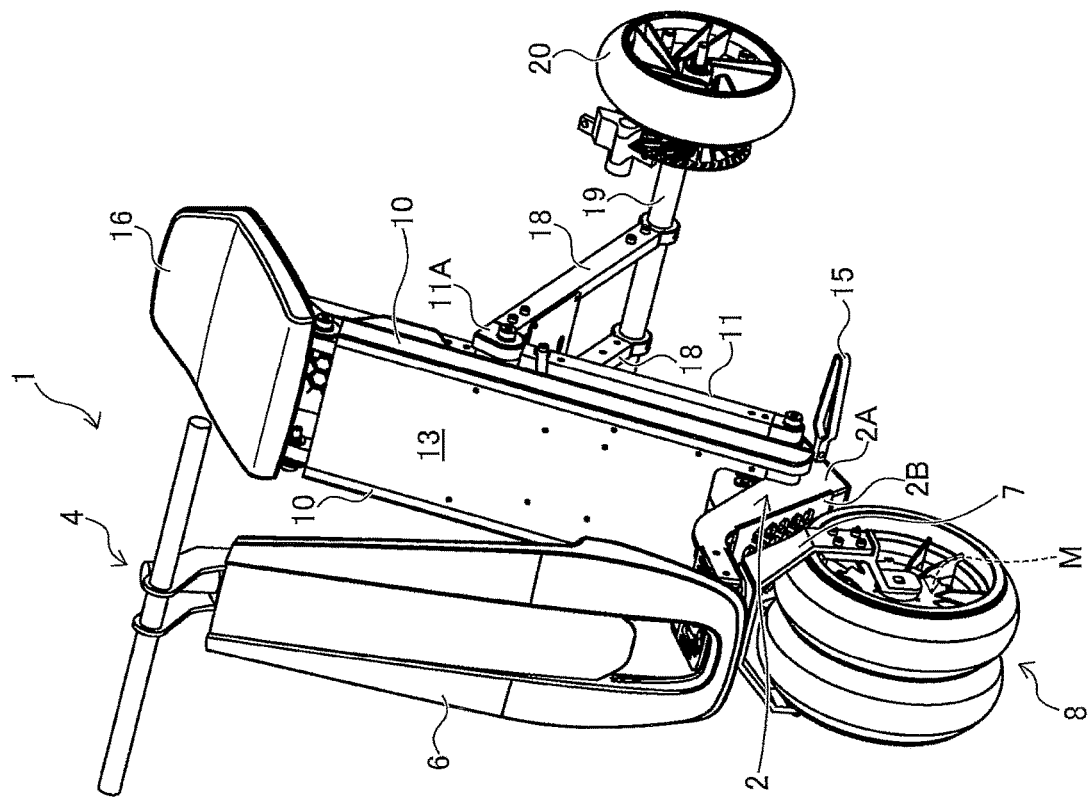
FIG. 2 is a front perspective view of the folding vehicle set in the seated driving mode.
Figure 4:
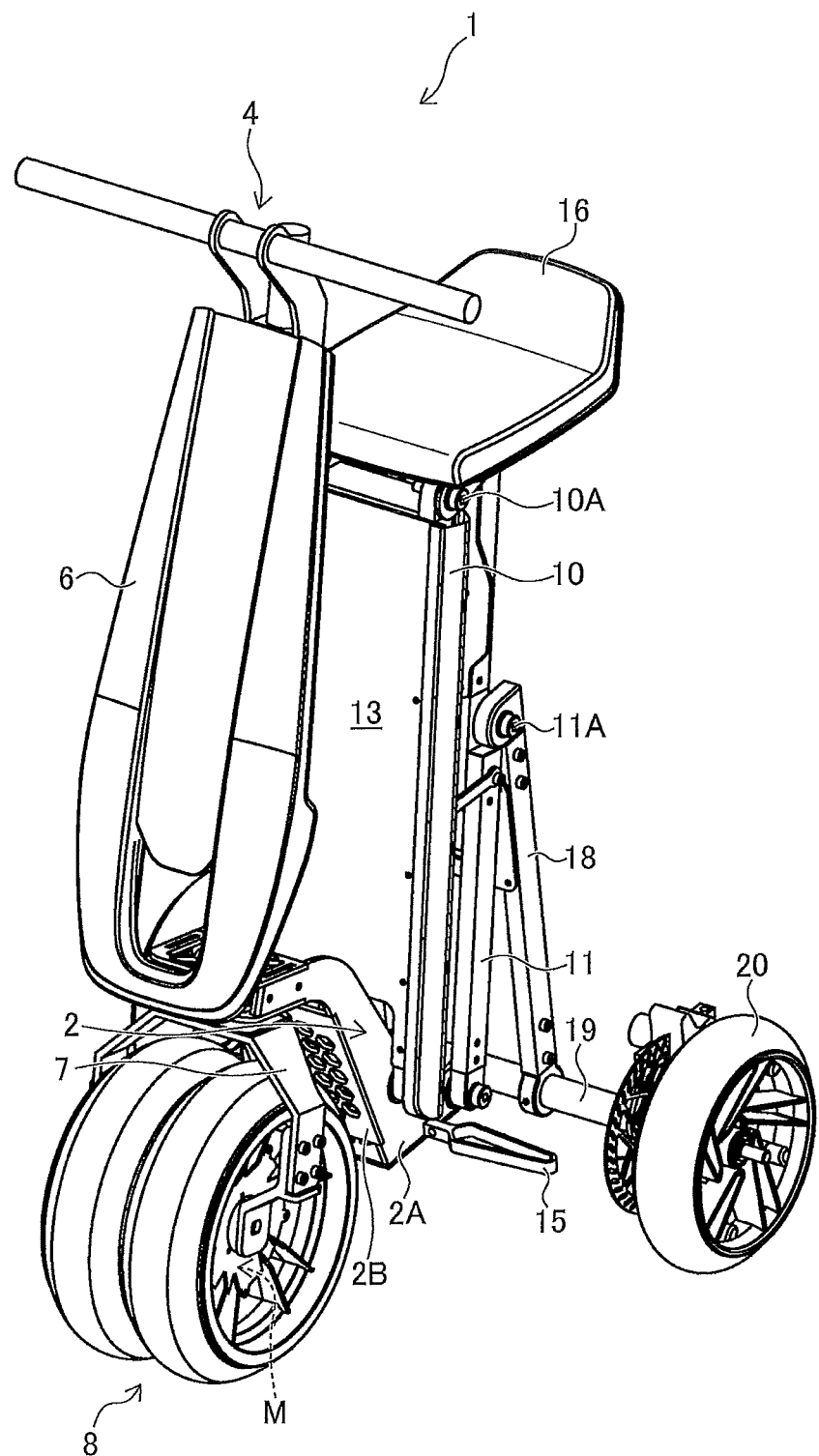
FIG. 4 is a front perspective view of the folding vehicle set in the folded mode.
Figure 6:
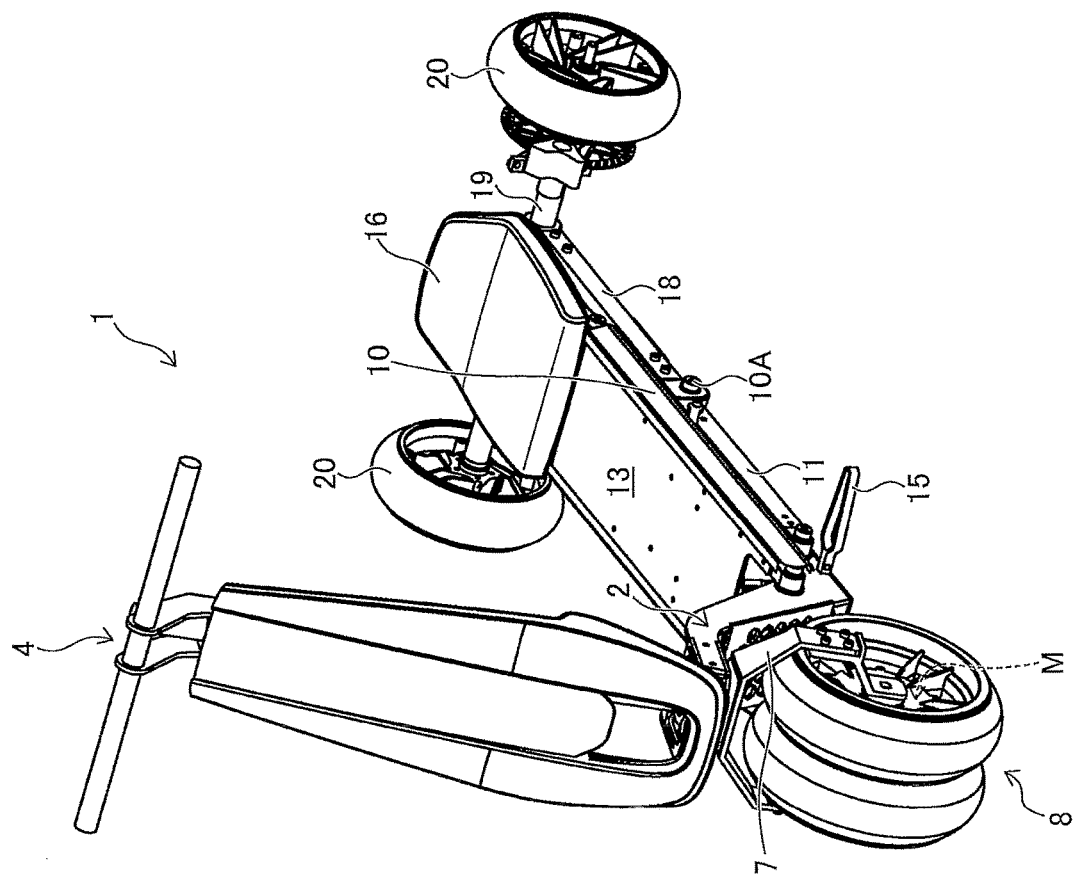
FIG. 6 is a front perspective view of the folding vehicle set in the standing driving mode.

The folding vehicle 1 includes a base frame 2 having the following form. Specifically, as illustrated in FIG. 2, FIG. 4, and FIG. 6, the base frame 2 includes a pair of side plates 2A and 2A, having a curved shape in side view, integrally coupled with each other via a flat plate 2B.

A front frame 3 is attached to a front portion of the base frame 2 pivotally in a substantially horizontal direction. A handle 4 is fixed to an upper end of the front frame 3. A cover 6 is attached to a front side of the front frame 3 via attachment members 5 and 5.

A wheel supporting frame 7 is fixed to a lower end of the front frame 3. A front wheel 8 is rotatably supported by the supporting frame 7. The front wheel 8 incorporates an in-wheel motor M that is driven by a battery 14 described later. Namely, the folding vehicle 1 self-travels with the in-wheel motor M and the battery 14 etc. The in-wheel motor M is well-known and thus will not be described in detail herein.

A main frame mechanism 9 is pivotally supported by both rear side portions of the base frame 2. The main frame mechanism 9 includes: first frame members 10 pivotally supported by outer surface upper portions of the side plates 2A, via a pivotally supporting member 2C; and second frame members 11 pivotally supported by outer surface lower portions of the side plates 2A, via a pivotally supporting member 2D, while being in parallel with the first frame members 10, at a position separated from the first frame members 10 by a predetermined distance. The first frame member 10 and the corresponding second frame member 11 are coupled to each other via a link member 12 in parallel with a line A passing through a pivot center of the first frame member 10 at the pivotally supporting member 2C and a pivot center of the second frame member 11 at the pivotally supporting member 2D. Thus, the first frame member 10 and the second frame member 11 form a parallel link mechanism.

A board 13 is disposed between the two first frame members 10 in parallel with each other (see FIG. 2). The battery 14, connected to the in-wheel motor M that drivingly rotates the front wheel 8, is disposed on a lower surface side of the board 13. A footrest 15 is attached to each of the side plates 2A of the base frame 2.

A first lock mechanism L1, described later, is provided between the first frame member 10 of the main frame mechanism 9 and the base frame 2.

A seat (seat part) 16 (hereinafter, referred to as "seat 16") is attached to upper end portions of the first frame members 10 and the second frame members 11 in the main frame mechanism 9. More specifically, the seat 16 is pivotally attached to the upper end portions of the two first frame members 10 via pivotally supporting members 10A in a front portion of a supporting plate 17 provided on a lower surface of the seat 16. A third lock mechanism L3 is provided between a rear portion of the supporting plate 17 and the upper end portions of the second frame members 11. The seat 16 can pivot in a counterclockwise direction from a state illustrated in FIG. 1 and FIG. 3, based on locking and unlocking functions of the third lock mechanism L3, described later.

A pair of swing arms 18 each have one end pivotally supported by a substantially center portion of a corresponding one of the second frame members 11 in a longitudinal direction via pivotally supporting members 11A. The swing arms 18 each have the other end pivotally supporting a shaft 19 (see FIG. 2). A pair of rear wheels 20 and 20 (see FIG. 6) are rotatably supported on both ends of the shaft 19.

A second lock mechanism L2, described later, is provided between the second frame members 11 and the swing arms 18.

Next, the first lock mechanism L1 provided between the first frame members 10 of the main frame mechanism 9 and the base frame 2 is described with reference to FIG. 7.

Figure 7A:
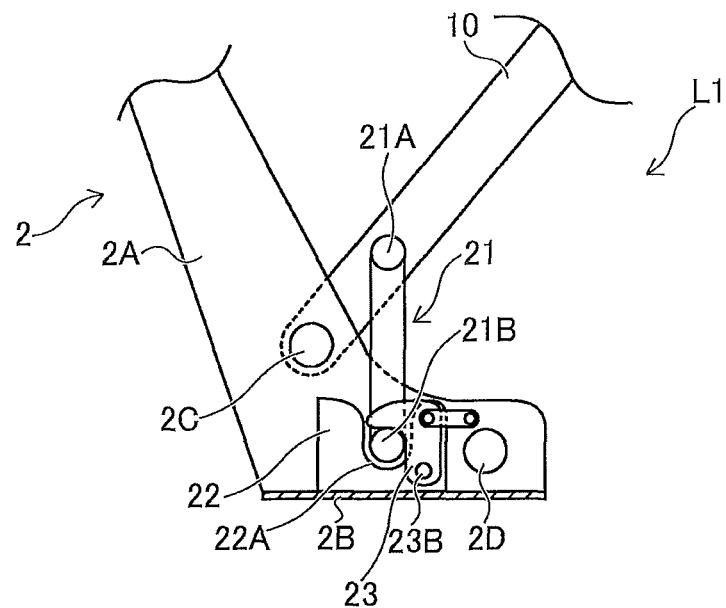
FIGS. 7A, 7B are diagrams schematically illustrating a first lock mechanism provided between a base frame and a main frame mechanism.
Figure 7B:
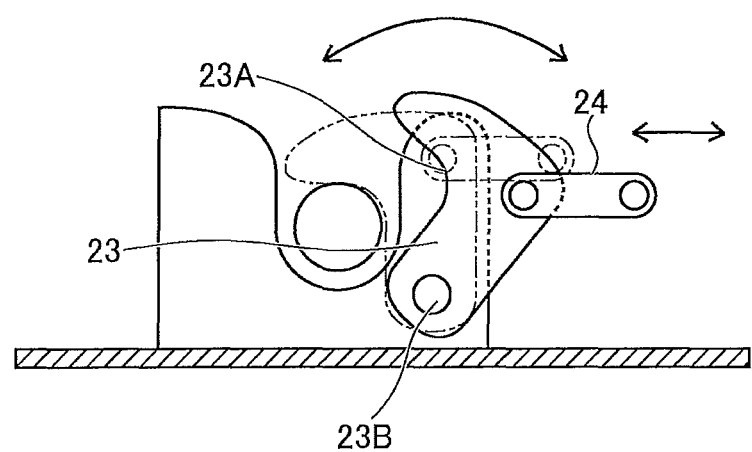

In FIGS. 7A and 7B, a striker 21, as a link member, is pivotally supported at the first frame member 10 of the main frame mechanism 9 via a supporting portion 21A. The striker 21 is a rod-shaped member having a substantially U shape in plain view. In FIG. 7A, the striker 21 has a lower portion serving as an engaged portion 21 B engaged with a hook portion 23A of a hook member 23 described later.

A receiving member 22 is fixed to the flat plate 2B in a bottom portion of the base frame 2. A U-shaped groove 22 A having a U shape in side view is formed on the receiving member 22. The hook member 23 including the hook portion 23A is pivotally supported at the receiving member 22 via a supporting member 23B. The hook member 23 is constantly urged in the counterclockwise direction by a spring incorporated therein.

A release lever 24 has one end coupled with the hook member 23. When the other end of the release lever 24 is pulled in a right direction in FIGS. 7A and 7B, against urging force of the spring in an appropriate way, the hook portion 23A of the hook member 23 engaged with the engaged portion 21B of the striker 21 is pivoted in a clockwise direction. Thus, the engagement between the engaged portion 21 B of the striker 21 and the hook portion 23A of the hook member 23 is released.

The main frame mechanism 9 is locked with the base frame 2, with the first lock mechanism L1 having the configuration described above, in the following manner. Specifically, as illustrated in FIG. 7A, the engaged portion 21B of the striker 21 is set up in the U-shaped groove 22A of the receiving member 22, and the hook member 23 is pivoted in the counterclockwise direction by the urging force of the spring. Thus, the base frame 2 and the main frame mechanism 9 are locked as in a state illustrated in FIG. 7A.

The locking between the base frame 2 and the main frame mechanism 9 can be released by pulling the release lever 24 in the right direction in FIG. 7B and releasing the engagement between the engaged portion 21B of the striker 21 and the hook portion 23A of the hook member 23.

Next, the second lock mechanism L2 provided between the second frame member 11 of the main frame mechanism 9 and the swing arm 18 is described with reference to FIG. 8.

Figure 8:
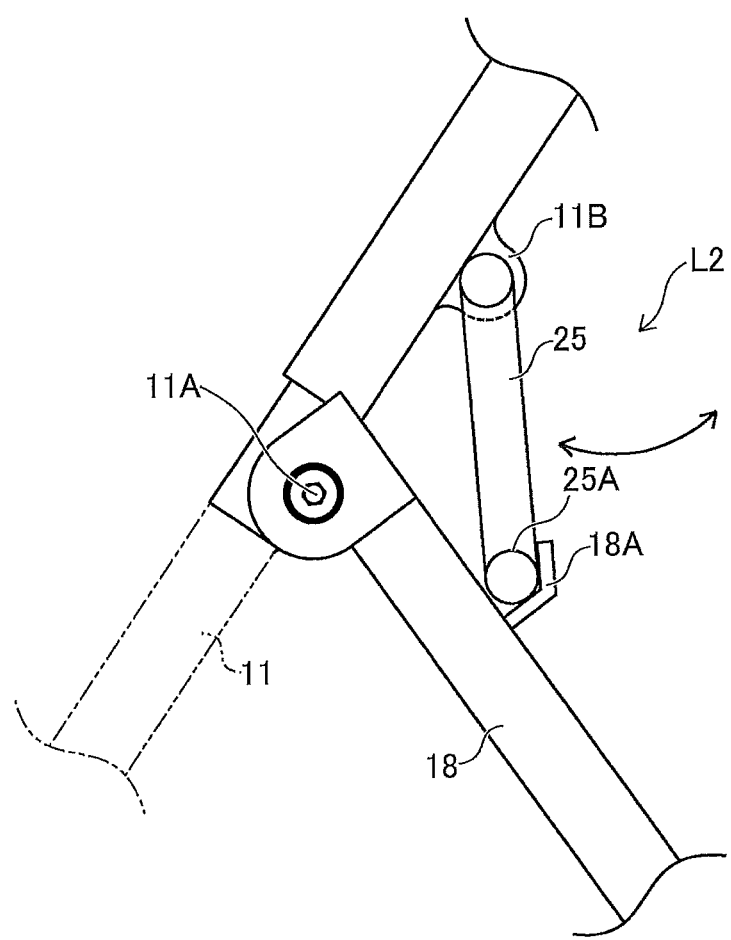
FIG. 8 is a diagram schematically illustrating a second lock mechanism provided between the main frame mechanism and swing arms.

In FIG. 8, a rod member 25 has one end pivotally supported at a position of the second frame member 11 above the pivotally supporting member 11 A pivotally supporting the swing arm 18, via the pivotally supporting member 11B. A stopper engaging portion 25A having a rod shape is formed at the other end of the rod member 25.

A stopper part 18A is formed on the swing arm 18 pivotally supported by the second frame member 11 via the pivotally supporting member 11A. The stopper engaging portion 25A of the rod member 25 is engaged with the stopper part 18A from the above.

The second frame member 11 and the swing arm 18 can be locked, with the second lock mechanism L2 having the configuration described above, in the following manner. Specifically, the second frame member 11 and the swing arm 18 are pivoted with respect to each other, and the stopper engaging portion 25A of the rod member 25 is engaged with the stopper part 18A of the swing arm 18. The engaging can be released by pivoting the second frame member 11 and the swing arm 18 with respect to each other, and detaching the stopper engaging portion 25A of the rod member 25 from the stopper part 18A of the swing arm 18.

Next, the third lock mechanism L3 provided between the rear portion of the supporting plate 17 of the seat 16 and the upper end portion of the second frame member 11 is described with reference to FIG. 9. In FIG. 9, the supporting plate 17 is omitted to facilitate the understanding.

Figure 9A:
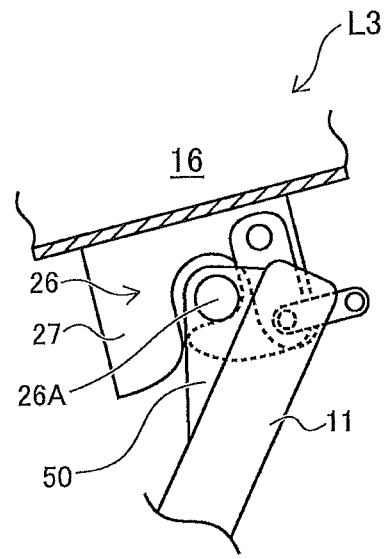
FIGS. 9A, 9B are diagrams schematically illustrating a third lock mechanism provided between the main frame mechanism and a seat.

The striker 26 is a linear rod-shaped member bridging between supporting members 50 attached to the upper end portions of the two second frame members 11, and serves as an engaged portion 26A engaging with a hook portion 28A of a hook member 28 described later as illustrated in FIG. 9A.

The receiving member 27, on which a U-shaped groove 27A having a U shape in side view is formed, is fixed on a bottom portion of the seat 16. The hook member 28 including the hook portion 28 A is pivotally supported at the receiving member 27 via a supporting member 28B. The hook member 28 is constantly urged in the clockwise direction by a spring incorporated therein.

A release lever 29 has one end coupled with the hook member 28. When the other end of the release lever 29 is pulled in the right direction in FIGS. 9A and 9B, against urging force of the spring in an appropriate way, the hook portion 28A of the hook member 28 engaged with the engaged portion 26A of the striker 26 is pivoted in the counterclockwise direction. Thus, the engagement between the engaged portion 26A of the striker 26 and the hook portion 28A of the hook member 28 is released.

The seat 16 and the upper end of the second frame member 11 are locked, with the third lock mechanism L3 having the configuration described above, in the following manner. Specifically, as illustrated in FIG. 9A, the engaged portion 26A of the striker 26 is set up in the U-shaped groove 27A of the receiving member 27, and the hook member 28 is pivoted in the clockwise direction by the urging force of the spring. Thus, the seat 16 and the second frame member 11 are locked as in a state illustrated in FIG. 9A.

Figure 9B:
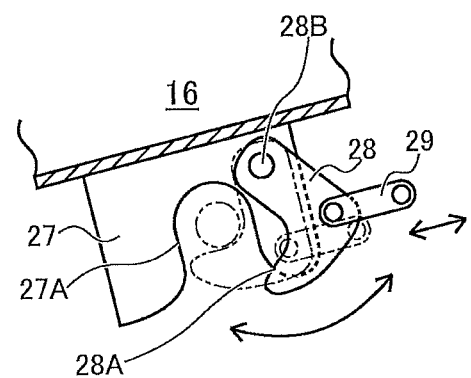

The locking of the seat 16 and the second frame member 11 can be released by pulling the release lever 29 in the right direction in FIGS. 9A and 9B and releasing the engagement between the engaged portion 26A of the striker 26 and the hook portion 28A of the hook member 28.

Figure 10:
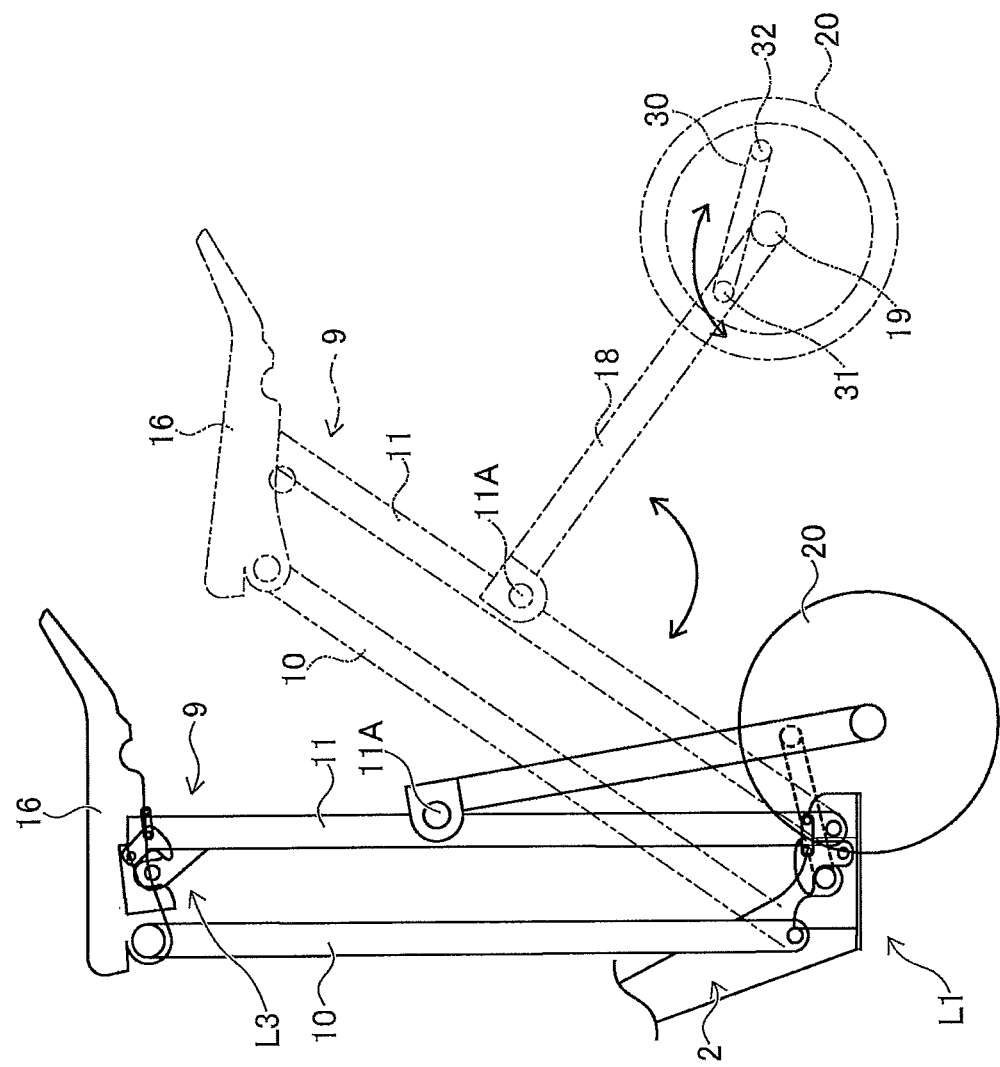
FIG. 10 is a diagram schematically illustrating an operation transitioning from the folded mode to the seated driving mode or from the seated driving mode to the folded mode of the folding vehicle.

As illustrated in FIG. 10, a striker 30, having a configuration similar to that of the striker 21, is pivotally supported at a rear end portion of the swing arm 18 (around a right end portion in FIG. 10) via a pivotally supporting portion 31. The striker 30 is a rod-shaped member having a substantially U shape in plain view, and has an engaged portion 32 engaged with the hook portion 23A of the hook member 23 in the first lock mechanism L1, on the side opposite to the pivotally supporting portion 31, as described below.

Next, a relationship between the lock mechanisms described above and folding vehicle 1 in a folded mode, a seated driving mode, and a standing driving mode is described.

Figure 1:
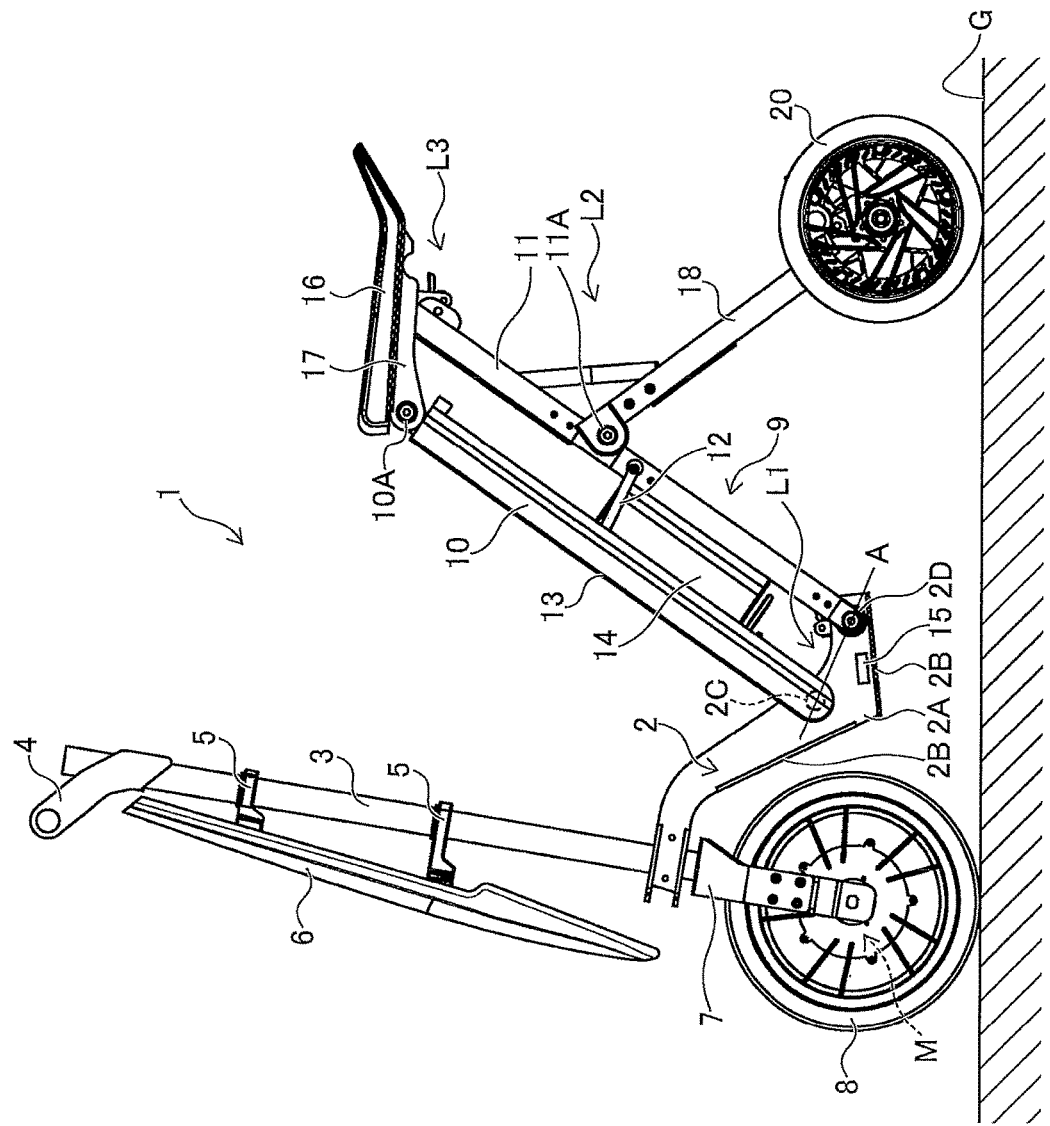
FIG. 1 is a side view of a folding vehicle according to the embodiment of the present disclosure set in a seated driving mode.

To begin with, the folding vehicle 1 is assumed to be in the seated driving mode as illustrated in FIGS. 1 and 2.

When the folding vehicle 1 is in the seated driving mode, the first lock mechanism L1 and the second lock mechanism L2 are each in the locked state.

More specifically, as illustrated in FIG. 7A, the engaged portion 21B of the striker 21 in the first lock mechanism L1 is fit in the U-shaped groove 22A of the receiving member 22, and the hook portion 23A of the hook member 23 is engaged with the engaged portion 21 B of the striker 21.

As illustrated in FIG. 8, the stopper engaging portion 25A of the rod member 25 of the second lock mechanism L2 is engaged with the stopper part 18A of the swing arm 18.

As a result, the seated driving mode is maintained with the first lock mechanism L1 and the second lock mechanism L2 cooperating to lock the base frame 2 and the main frame mechanism 9 to achieve the state illustrated in FIG. 1, FIG. 2, FIG. 7A, and FIG. 8. Thus, a driver can enjoy safe seated driving while being seated on the seat 16 (self-travelling of the folding vehicle 1).

Figure 3:
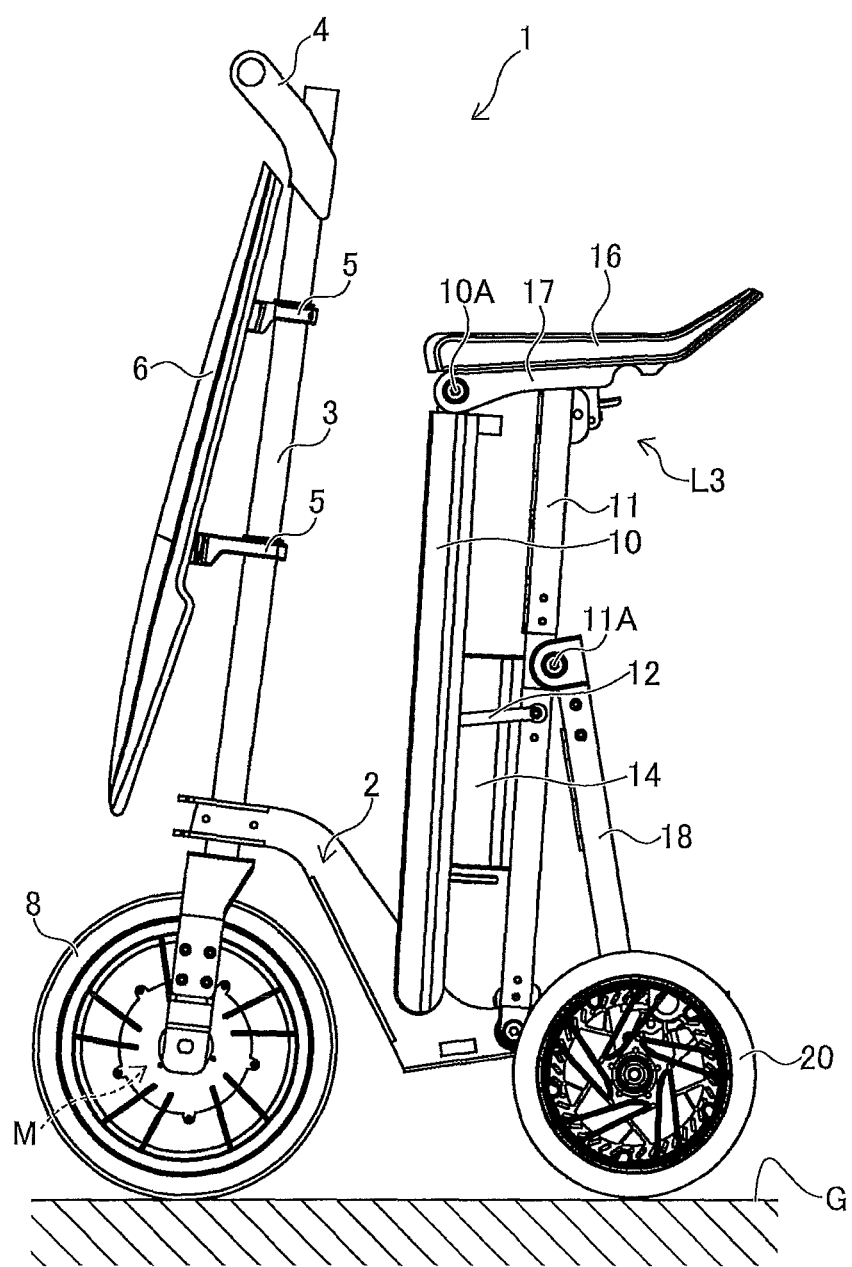
FIG. 3 is a side view of the folding vehicle set in a folded mode.

The seated driving mode transitions to the folded mode illustrated in FIGS. 3 and 4 in the following manner. First of all, the release lever 24 is pulled in the right direction in FIG. 7B to release the locking of the base frame 2 and the main frame mechanism 9. Thus, the engagement between the engaged portion 21B of the striker 21 and the hook portion 23A of the hook member 23 is released, whereby the locking by the first lock mechanism L1 is released. The second frame member 11 and the swing arm 18 are pivoted with respect to each other, and thus the stopper engaging portion 25A of the rod member 25 is detached from the stopper part 18A of the swing arm 18, whereby the locking by the second lock mechanism L2 is released.

Then, the main frame mechanism 9, which has become pivotable with respect to the base frame 2 as a result of the above process, is pivoted toward the front frame 3. In this process, the second lock mechanism L2 is unlocked, and thus the swing arm 18 approaches the front frame 3 as the main frame mechanism 9 pivots. Thus, the main frame mechanism 9 and the swing arm 18 are in the folded mode in illustrated in FIGS. 3 and 4.

In the folded mode the engaged portion 32 of the striker 30 pivotally supported at the swing arm 18 is fit in the U-shaped groove 22A of the receiving member 22 in the first lock mechanism L1, and the hook portion 23A of the hook member 23 is engaged.

Thus, in the folded mode, the main frame mechanism 9 can be prevented from pivoting from the front frame 3, whereby the folded mode can be stably maintained.

Even in the folded mode, a driver can enjoy the safe seated driving while being seated on the seat 16 (self-travelling of the folding vehicle 1).

Figure 5:
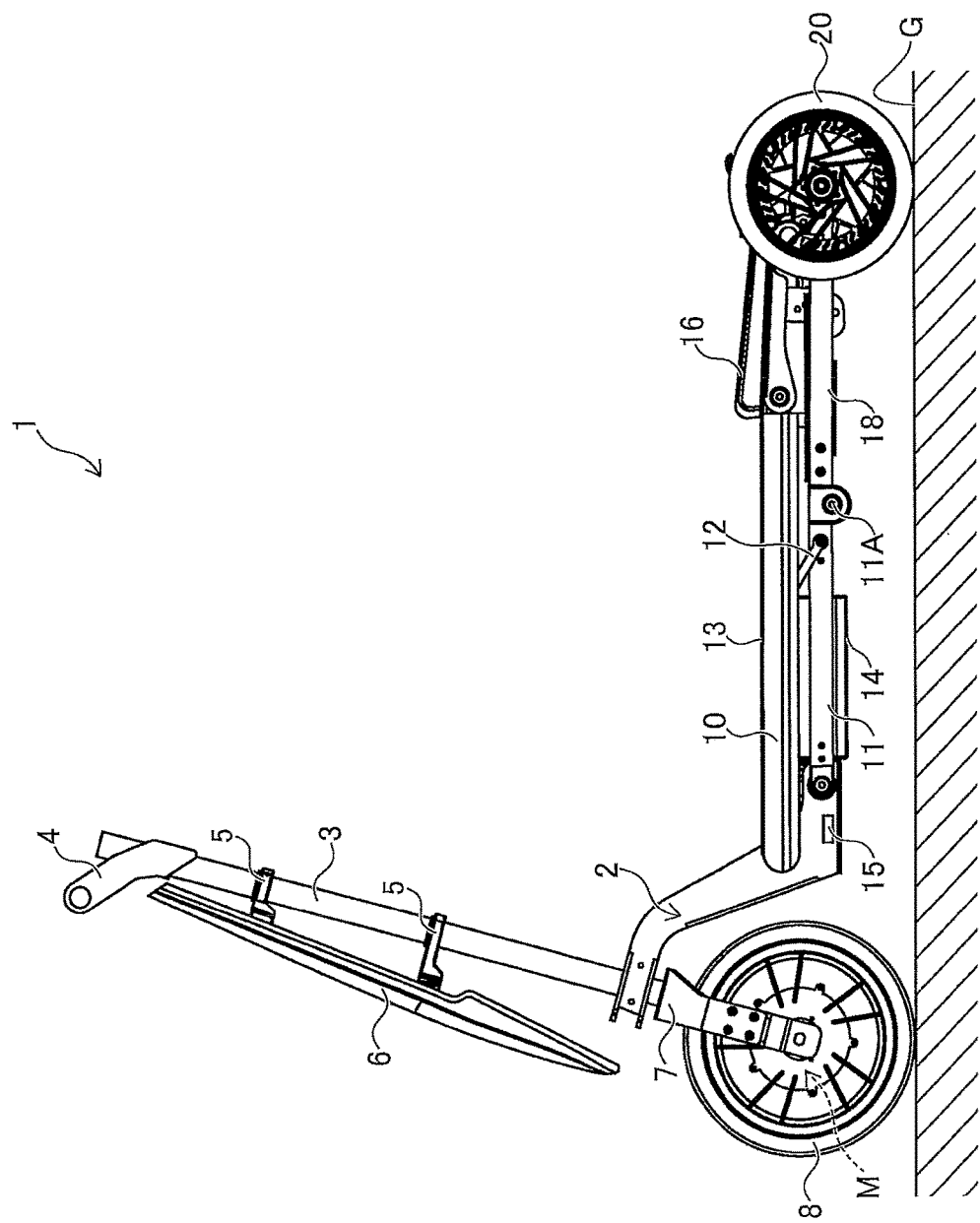
FIG. 5 is a side view of the folding vehicle set in a standing driving mode.

When the seated driving mode illustrated in FIGS. 1 and 2 transitions to the standing driving mode illustrated in FIGS. 5 and 6, the following operation is performed. Specifically, as in the case described above, the release lever 24 is pulled in the right direction in FIG. 7B to release the locking between the base frame 2 and the main frame mechanism 9, and the engagement between the engaged portion 21 B of the striker 21 and the hook portion 23A of the hook member 23 is released, whereby the first lock mechanism L1 is unlocked. The second frame member 11 and the swing arm 18 are pivoted with respect to each other to detach the stopper engaging portion 25A of the rod member 25 from the stopper part 18A of the swing arm 18, whereby the second lock mechanism L2 is unlocked. Furthermore, the release lever 29 is pulled in the right direction in FIGS. 9A and 9B to release the engagement between the engaged portion 26A of the striker 26 and the hook portion 28A of the hook member 28, whereby the third lock mechanism L3 is further unlocked.

Figure 11:
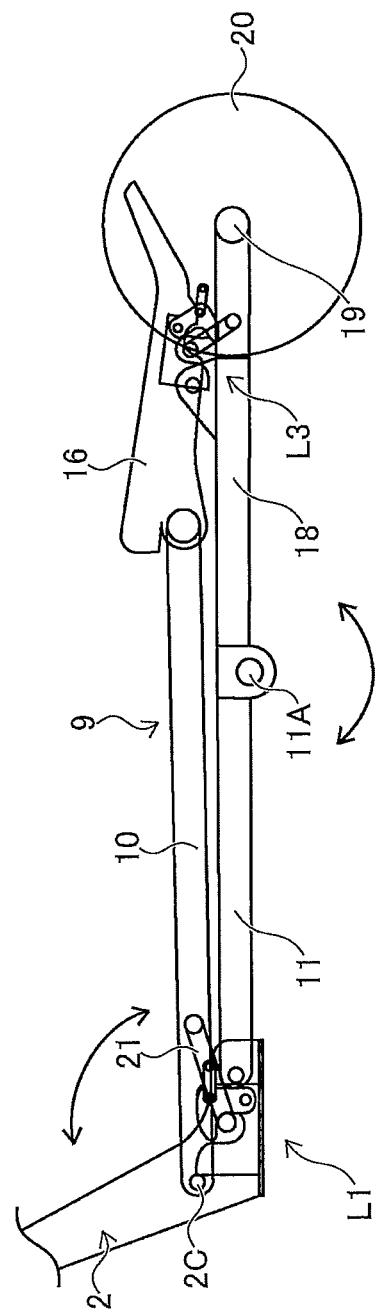
FIG. 11 is a diagram schematically illustrating a locked state of the first lock mechanism and the third lock mechanism in the standing driving mode of the folding vehicle.

The main frame mechanism 9, which has become pivotable with respect to the base frame 2 as a result of the above process, is pivoted in a direction of moving away from the front frame 3 (namely, the swing arm 18 side) as illustrated in FIG. 10. In this process, the second lock mechanism L2 is unlocked, and thus the swing arm 18 moves away from the front frame 3 as the main frame mechanism 9 pivots. Thus, the main frame mechanism 9 and the swing arm 18 are in the standing driving mode as illustrated in FIG. 11. In the standing driving mode, as illustrated in FIG. 5, the board 13 and the seat 16 are positioned substantially parallel to a running surface G.

In the standing driving mode, the engaged portion 21B of the striker 21 in the first lock mechanism L1 is fit in the U-shaped groove 22A of the receiving member 22, and the hook portion 23A of the hook member 23 is engaged with the engaged portion 21B of the striker 21. The engaged portion 32 of the striker 30 pivotally supported at the swing arm 18 is set up in the U-shaped groove 27A of the receiving member 27 in the third lock mechanism L3, and the hook member 28 is pivoted in the counterclockwise direction by the urging force of the spring, whereby the third lock mechanism L3 is locked.

Thus, in the standing driving mode, the base frame 2 and the main frame mechanism 9 as well as the main frame mechanism 9 and the swing arm 18 can be locked with each other in a state illustrated in FIG. 11. Thus, the driver on the board 13 can enjoy the safe standing driving (self-traveling of the folding vehicle 1).

The brake levers provided to both sides of the handle 4, wiring between the brake levers and brakes, electric wiring for a power supply for driving the in-wheel motor M, and the like which are omitted in the present embodiment may be appropriately set in the actual implementation.

In the present embodiment, the third lock mechanism L3 needs to be unlocked when the folding vehicle 1 is set in the standing driving mode. As described above, the standing driving mode may be achieved with the state of locking the seat 16 to the first frame member 10 and the second frame member 11 maintained and without unlocking the third lock mechanism L3, by appropriately setting the attaching positions of the first frame member 10 and the second frame member 11, forming the parallel link mechanism, on the base frame 2, and the mounting condition of the seat 16 to the first frame member 10 and the second frame member 11.

2. Coupling Member

Next, a coupling member for coupling the wheelchair to the folding vehicle 1 is described. In the present embodiment, the first coupling member, the second coupling member, or the third coupling member is provided in the folding vehicle 1 as the coupling member. Hereinafter, the first coupling member, the second coupling member, and the third coupling member are described sequentially.

[2.-1 First Coupling Member]

Figure 12:
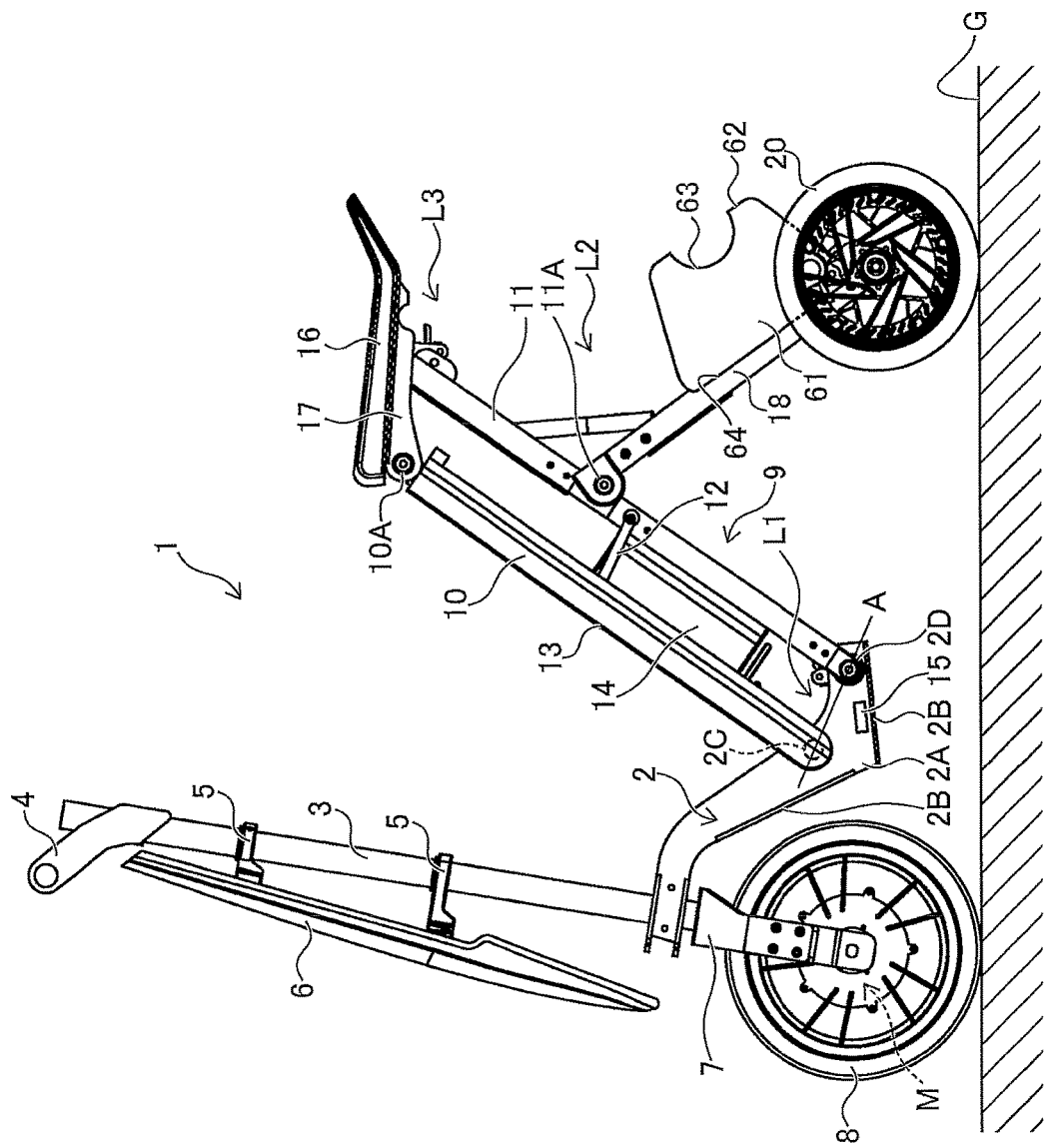
FIG. 12 is a side view of the folding vehicle provided with the first coupling member and set in the seated driving mode.

Firstly, the first coupling member is described with reference to FIGS. 12 to 15. The first coupling members 61 are flat plates formed into a substantially trapezoidal shape in side view of FIG. 12 and is provided at the same locations of each swing arm 18. A recessed part 63 pierced into a semicircular shape in side view of FIG. 12 is provided in an upper bottom 62 of the first coupling member 61. A lower bottom 64 of the first coupling member 61 is fixed to an outer side surface of the swing arm 18 directly facing the rear wheel 20.

Figure 13:
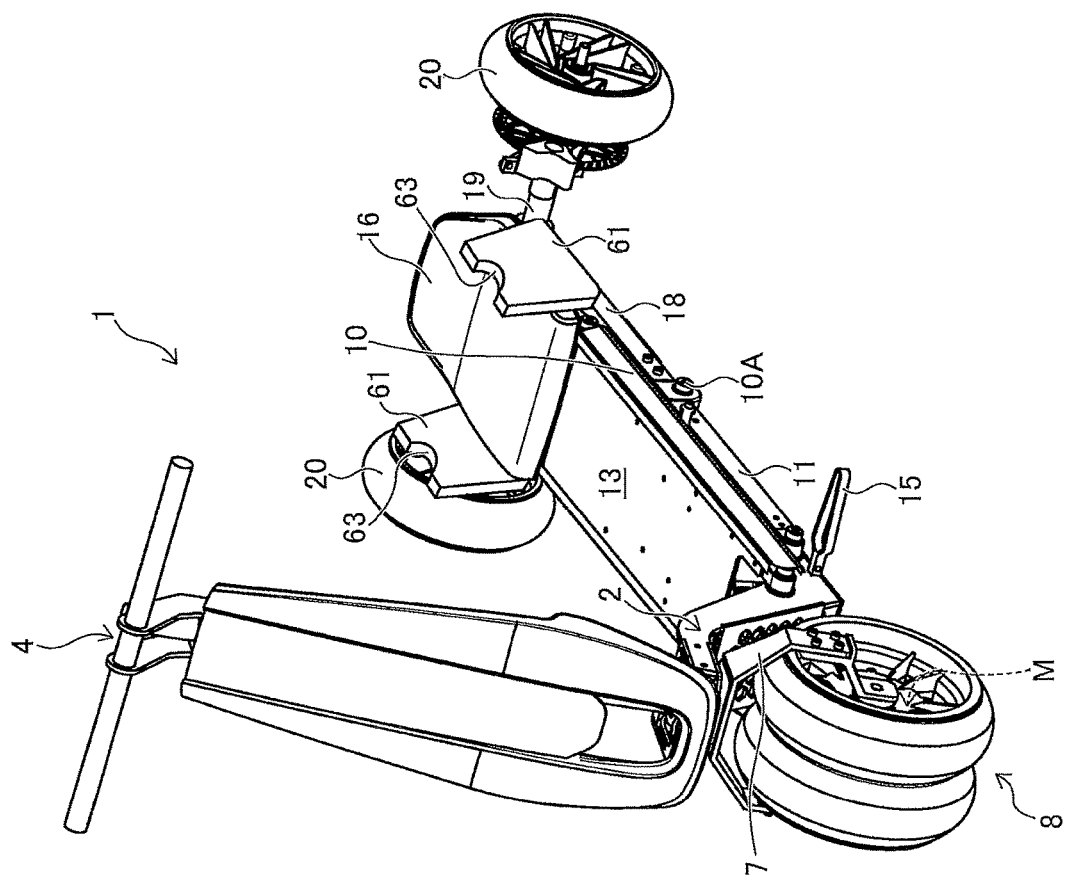
FIG. 13 is a front perspective view of the folding vehicle provided with the first coupling member and set in the standing driving mode.

As illustrated in FIG. 13, when the folding vehicle 1 is set in the standing driving mode, a pair of first coupling members 61, 61 moves to between a pair of rear wheels 20, 20. Between the pair of rear wheels 20, 20, the pair of first coupling members 61, 61 is in a state each standing along a side surface of the seat 16, and faces to each other via the seat 16. Further, each of the recessed parts 63, 63 is positioned on an upper side of each of the first coupling members 61, 61 between the pair of rear wheels 20, 20, and faces to each other via the seat 16.

Figure 14:
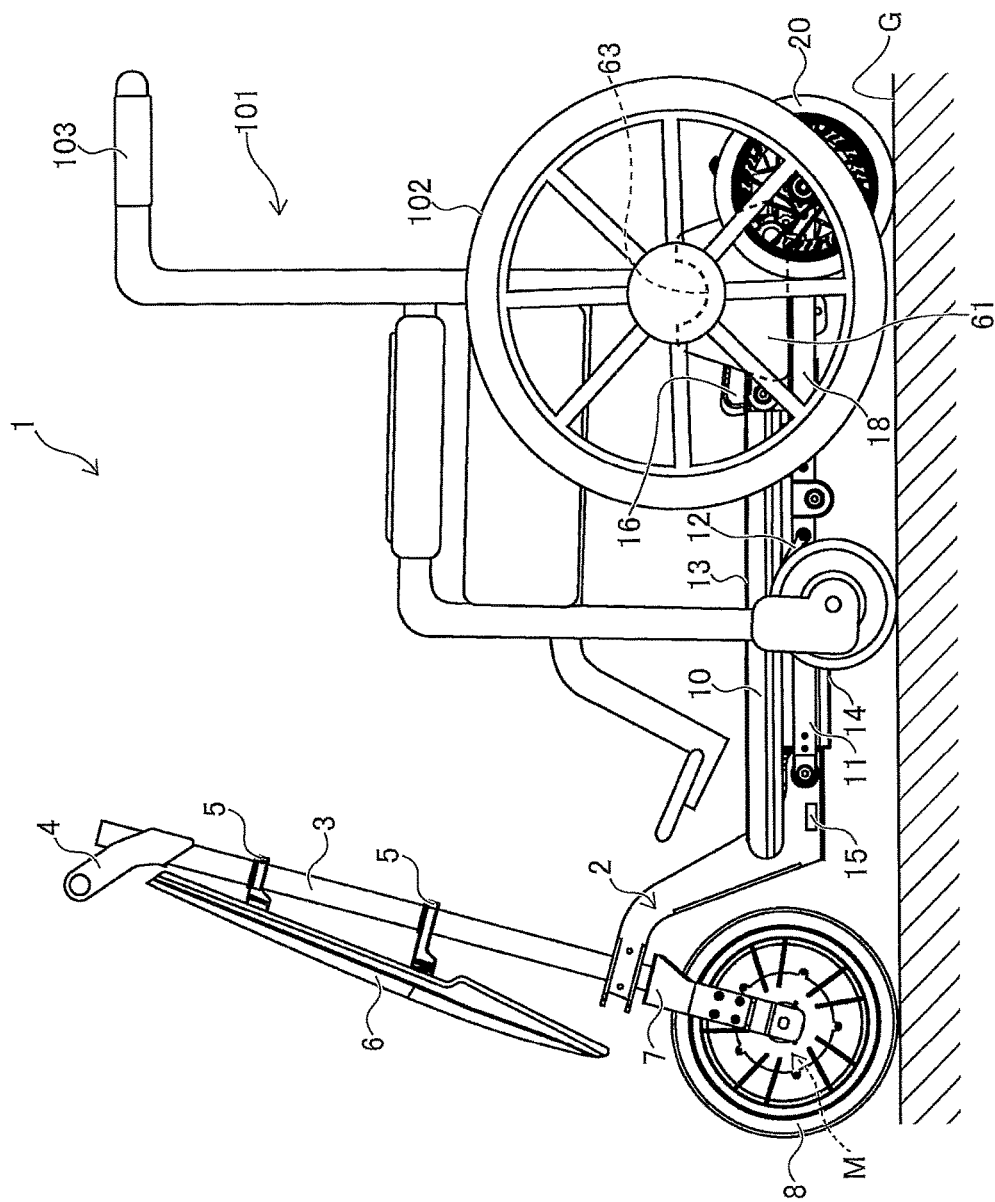
FIG. 14 is a side view of the folding vehicle set in the standing driving mode and coupled to a wheelchair by the first coupling member.

As illustrated in FIG. 14, in the folding vehicle 1 in the standing driving mode, when component members of the wheelchair 101 (for example, a cross pipe or a coupling pipe described later) are mounted on the recessed part 63 of the first coupling member 61, the wheelchair 101 is mounted in a state separating rear wheels 102 from the running surface G. As a result, the wheelchair 101 can be moved by the folding vehicle 1 in the standing driving mode. A reference sign 103 indicates a push-handle of the wheelchair 101.

Figure 15A:
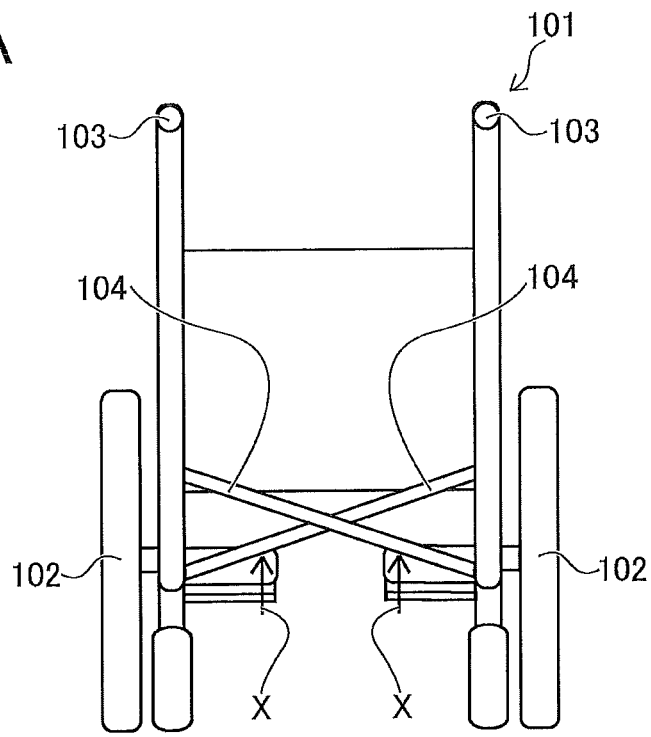
FIGS. 15A, 15B are diagrams schematically illustrating from a back side of the wheelchair a coupling position of the wheelchair coupled to the folding vehicle set in the standing driving mode by the first coupling member or the second coupling member.
Figure 15B:
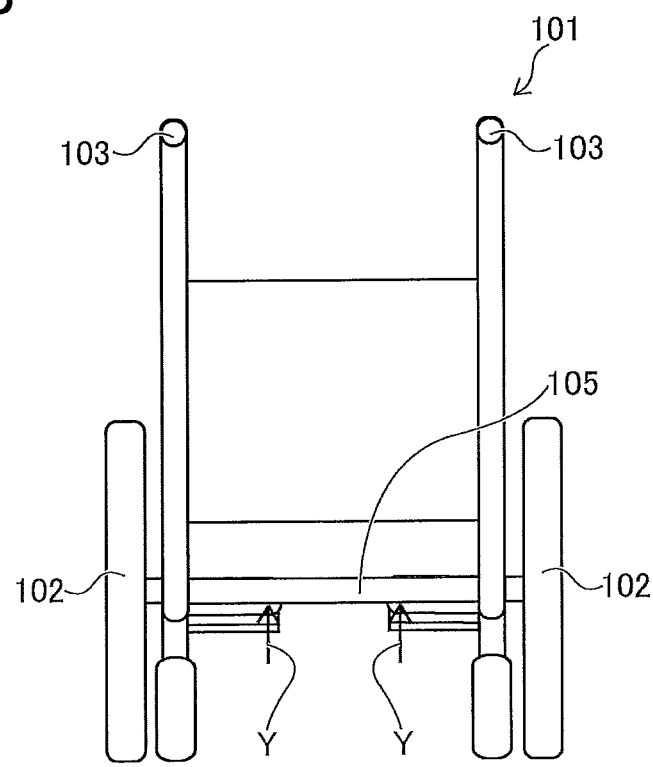

When the wheelchair 101 has a foldable structure, as illustrated in FIG. 15A, the cross pipe 104 is mounted on the recessed part 63 of the first coupling member 61 at a position nearer to the rear wheels 102 from a center in a longitudinal direction of the cross pipe 104 (positions indicated by arrows X). Meanwhile, when the wheelchair 101 has a structure which is not able to be folded, as illustrated in FIG. 15B, the coupling pipe 105 is mounted on the recessed part 63 of the first coupling member 61 at a position nearer to the rear wheels 102 from a center in a longitudinal direction of the coupling pipe 105 (positions indicated by arrows Y).

[2.-2 Second Coupling Member]

Figure 16:
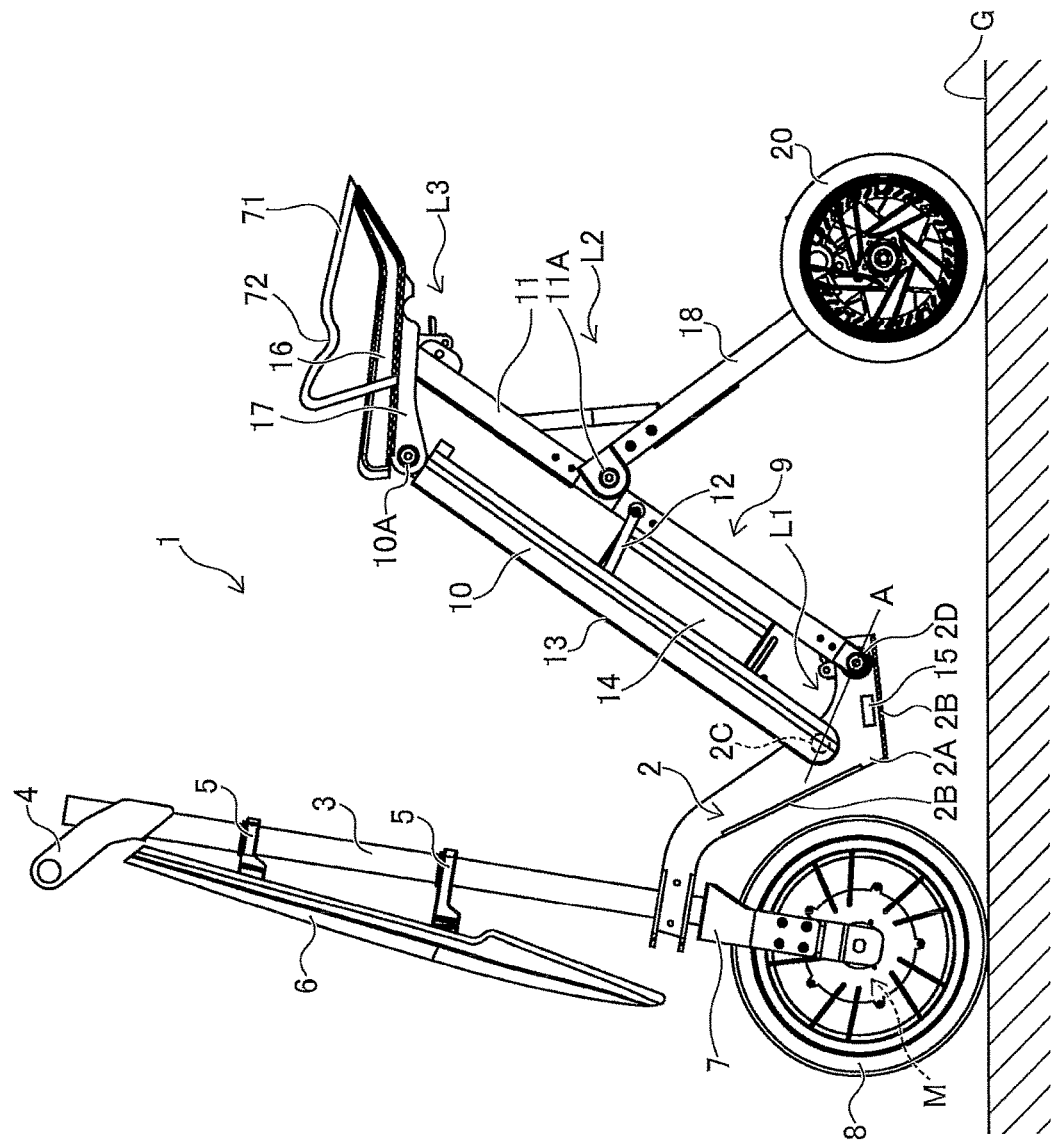
FIG. 16 is a side view of the folding vehicle provided with the second coupling member and set in the seated driving mode.

Next, the second coupling member is described with reference to FIGS. 16 to 18. Second coupling members 71 are pipes made of a metal and formed into a substantially M-shape in side view of FIG. 16 and are each provided at the same positions on both side surfaces of the seat 16 on the each rear wheel 20, 20 side. A front portion of the second coupling member 71 is fixed to the side surface of the seat 16 at a position nearer to the front frame 3 from a center in a longitudinal direction of the seat 16. Meanwhile, a rear portion of the second coupling member 71 is fixed to a rear end of the side surface of the seat 16. A recessed part 72 formed into a substantially inverse V-shape in side view of FIG. 16 is provided on an upper side of the second coupling member 71.

Figure 17:
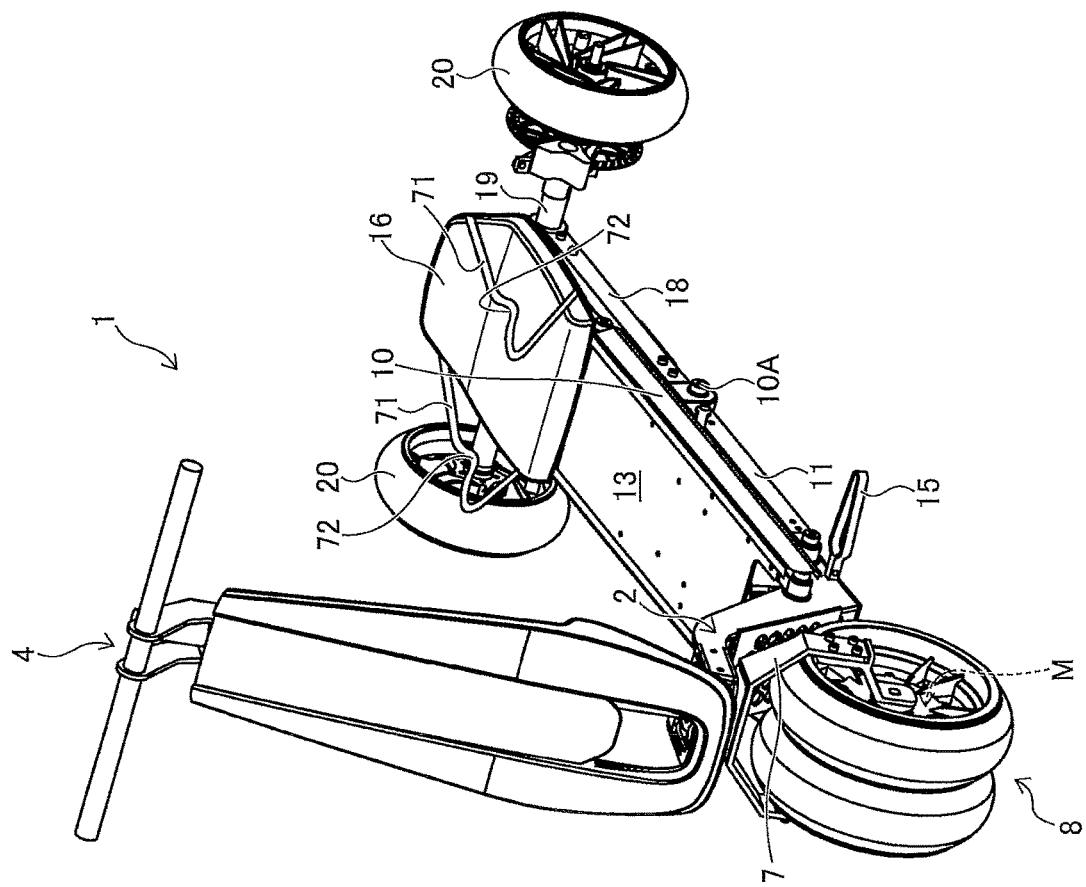
FIG. 17 is a front perspective view of the folding vehicle provided with the second coupling member and set in the standing driving mode.

As illustrated in FIG. 17, when the folding vehicle 1 is set in the standing driving mode, a pair of the second coupling members 71, 71 moves to between the pair of rear wheels 20, 20. Between the pair of rear wheels 20, 20, the pair of second coupling members 71, 71 is in a state each standing along the side surface of the seat 16 and faces to each other via the seat 16. Further, between the pair of rear wheels 20, 20, each of the recessed parts 72, 72 is positioned on the upper side of each of the second coupling members 71, 71 and faces to each other via the seat 16.

Figure 18:
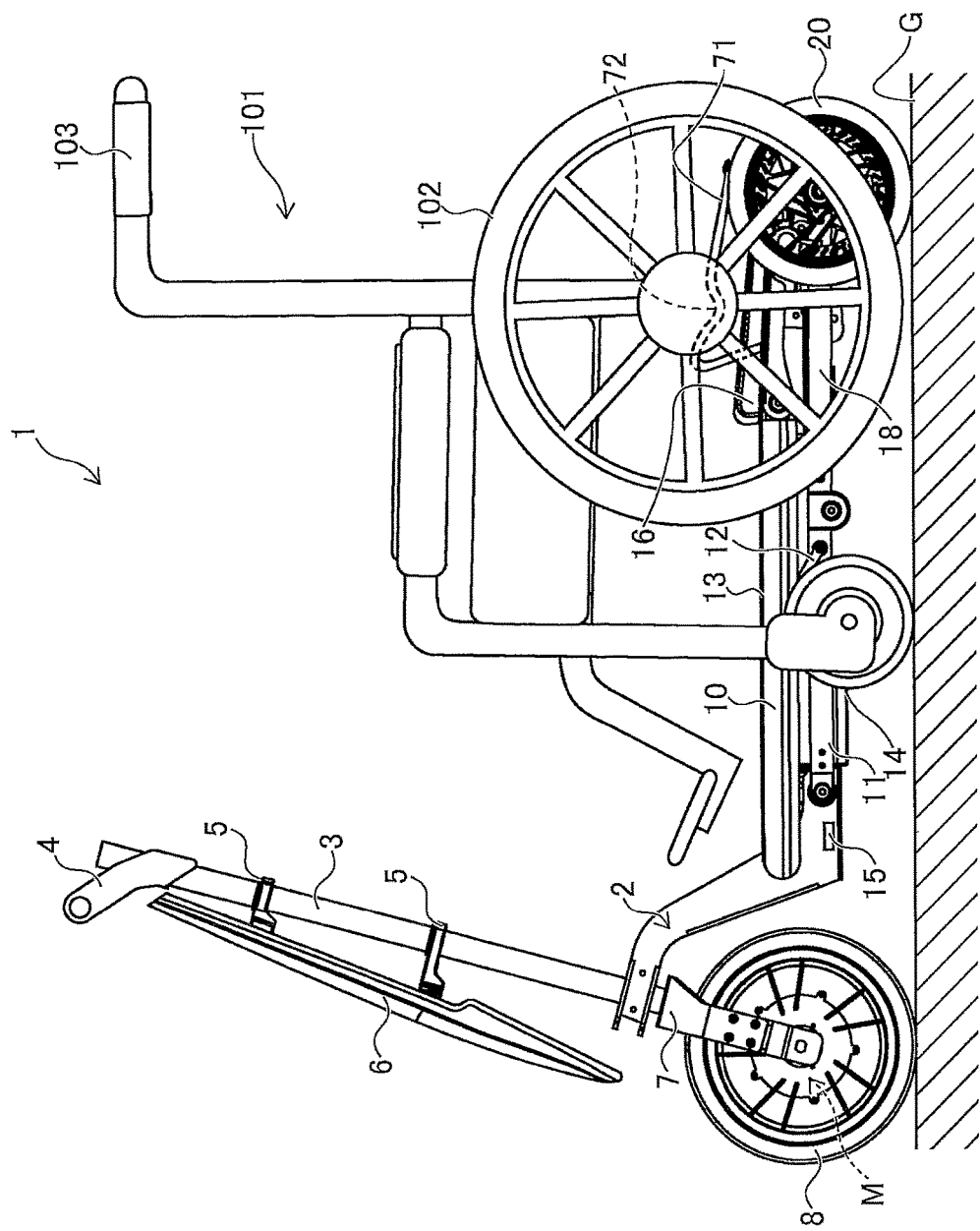
FIG. 18 is a side view of the folding vehicle set in the standing driving mode and coupled to the wheelchair by the second coupling member.

As illustrated in FIG. 18, in the folding vehicle 1 in the standing driving mode, when the component members of the wheelchair 101 (for example, the cross pipe 104 or the coupling pipe 105 as described above) are mounted on the recessed part 72 of the second coupling member 71, the wheelchair 101 is mounted in a state separating the rear wheels 102 from the running surface G. As a result, the wheelchair 101 can be moved by the folding vehicle 1 in the standing driving mode.

A position where the wheelchair 101 having a foldable structure is mounted on the recessed part 72 of the second coupling member 71 and a position where the wheelchair 101 having a structure which is not able to be folded is mounted on the recessed part 72 of the second coupling member 71 are almost the same as the first coupling member 61 as described above (see FIG. 15).

[2.-3 Third Coupling Member]

Figure 19:
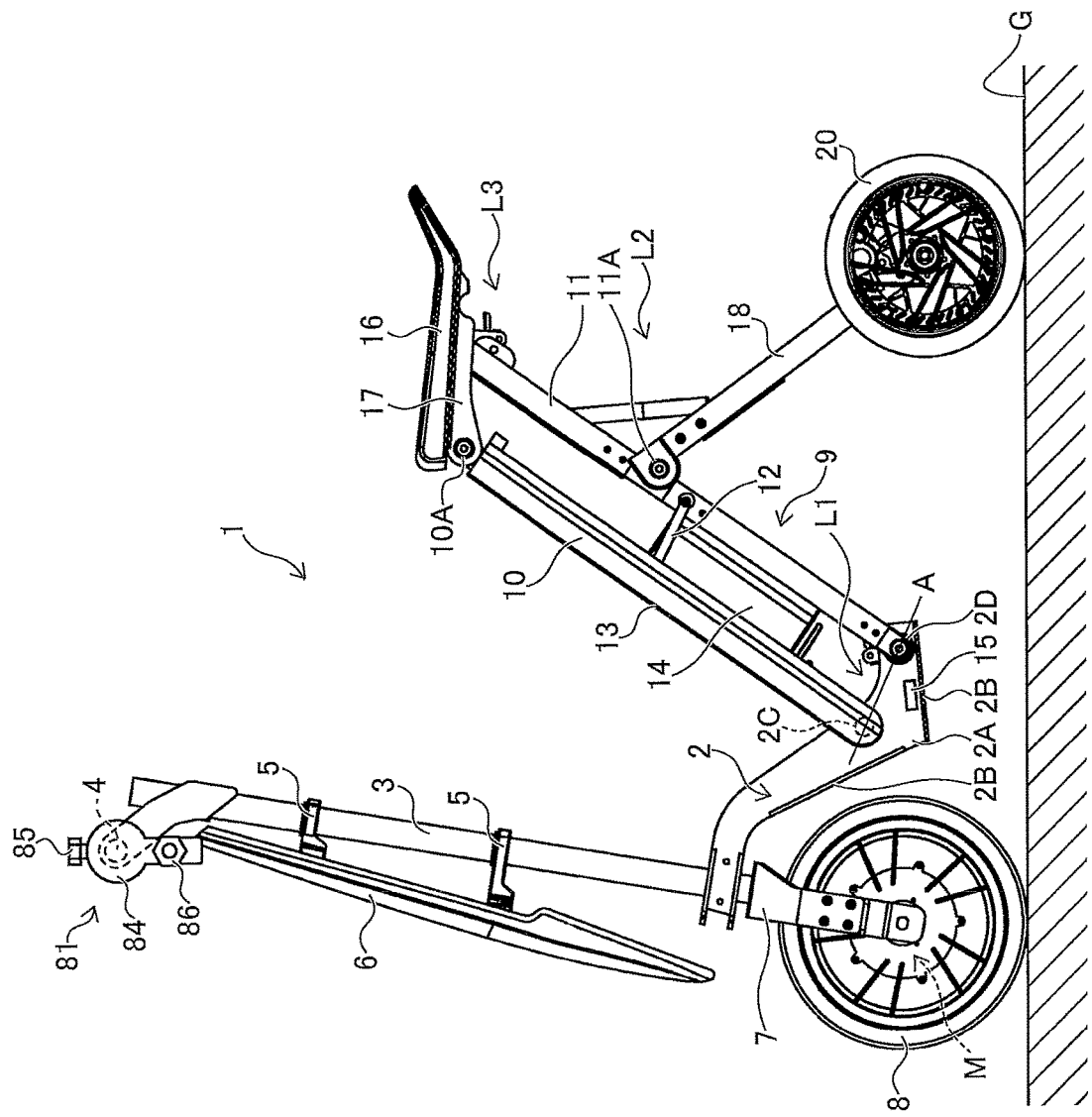
FIG. 19 is a side view of the folding vehicle provided with the third coupling member and set in the seated driving mode.
Figure 20:
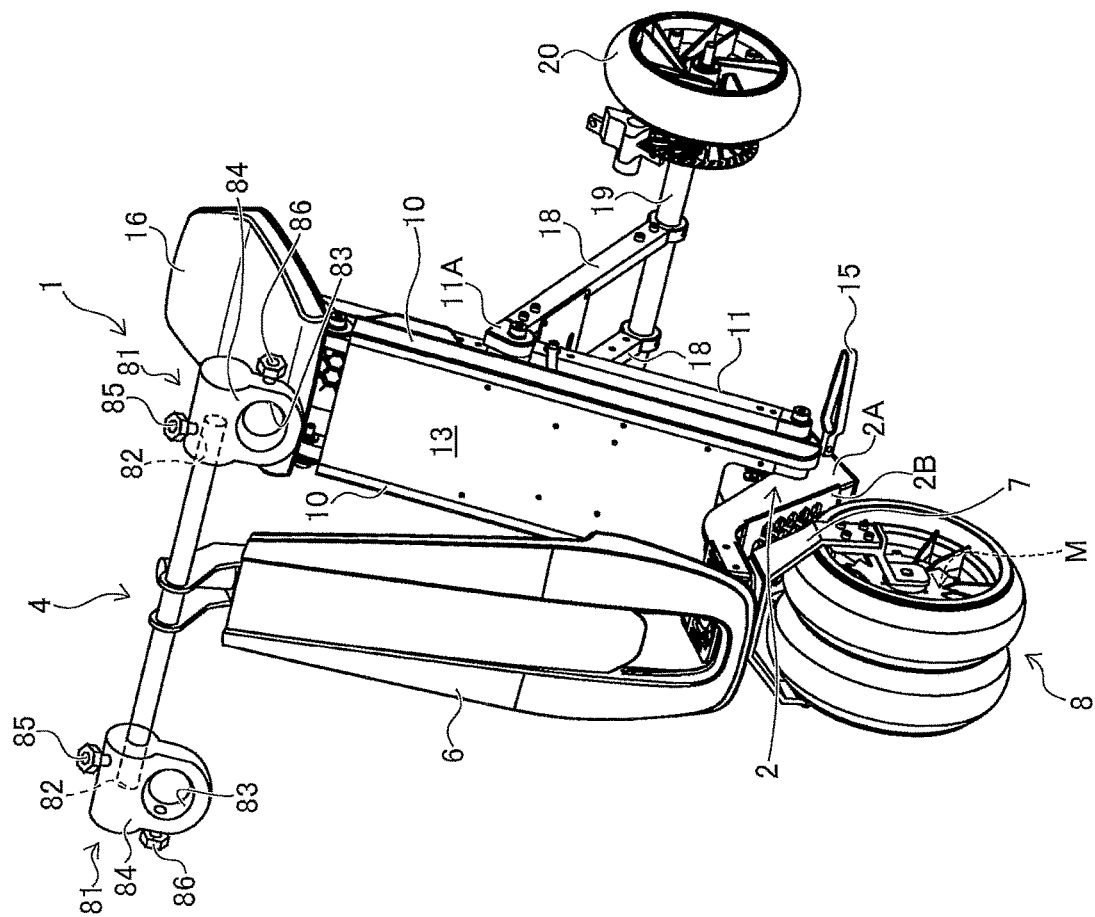
FIG. 20 is a front perspective view of the folding vehicle provided with the third coupling member and set in the seated driving mode.
Figure 21:
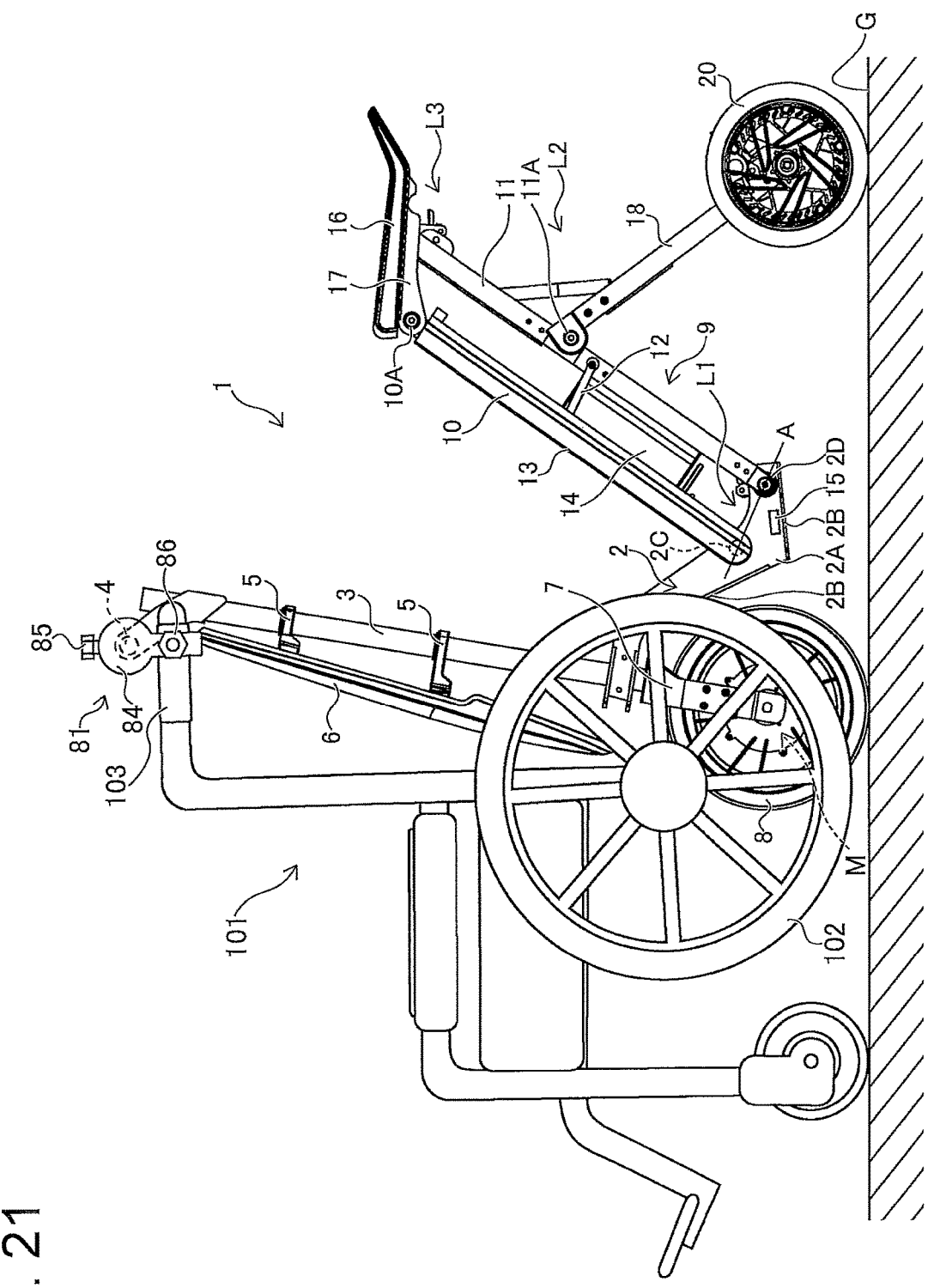
FIG. 21 is a side view of the folding vehicle set in the seated driving mode and coupled to the wheelchair by the third coupling member.

Next, the third coupling member is described with reference to FIGS. 19 to 23. As illustrated in FIGS. 19 and 20, the third coupling members 81 are each attached to both end portions of the handle 4. The third coupling member 81 includes a main body 84 having the first coupling hole 82 and the second coupling hole 83.

The first coupling hole 82 having the size into which the end portion of the handle 4 is fitted is formed in the main body 84. When the end portion of the handle 4 is inserted and fitted into the first coupling hole 82, the end portion of the handle 4 is fixed to the main body 84 by a fixing screw 85 screwed from an above of the main body 84. As a result, each of the third coupling members 81, 81 is fixed to the both end portions of the handle 4.

The main body 84 is penetrated into the second coupling hole 83 having the size into which an end portion of the push-handle 103 of the wheelchair 101 (see FIGS. 14 and 18) can be inserted. When the end portion of the push-handle 103 is inserted into the second coupling hole 83, the end portion of the push-handle 103 is fixed to the main body 84 by a fixing screw 86 screwed from an outer side of the main body 84. As a result, the push-handle 103 is fixed to each of the third coupling members 81, 81.

When the handle 4 and the push-handle 103 are coupled to each other via each of the third coupling members 81, 81 as described above, as illustrated in FIGS. 21 to 23, the folding vehicle 1 and the wheelchair 101 become continuous to each other.

As a result, the folding vehicle 1 can be moved while pushing the wheelchair 101. When the folding vehicle 1 is moved, the folding vehicle 1 is set in any one of the seated driving mode illustrated in FIG. 21, the folded mode illustrated in FIG. 22, and the standing driving mode illustrated in FIG. 23. In the folding vehicle 1, a driving state can be switched to any one of the seated driving mode illustrated in FIG. 21, the folded mode illustrated in FIG. 22, and the standing driving mode illustrated in FIG. 23 as described above while maintaining a state in which the folding vehicle 1 and the wheelchair 101 are continuous to each other.

3. Summary

As described above, the folding vehicle 1 according to the present embodiment can self-travel by the battery 14 and the in-wheel motor M in an independent state in which the folding vehicle 1 is not coupled to the wheelchair 101. Further, the folding vehicle 1 can move the wheelchair 101 coupled thereto via any one of each of the coupling members 61, the coupling members 71, and the coupling members 81 by self-travelling of the battery 14 and the in-wheel motor M. Therefore, the folding vehicle 1 is capable of assisting power of the wheelchair 101 coupled to the folding vehicle 1 and is capable of travelling alone in a state of being detached from the wheelchair 101.

The folding vehicle 1 can move the wheelchair 101 coupled thereto via any one of each of the coupling members 61, the coupling members 71, and the coupling members 81 by self-travelling of the battery 14 and the in-wheel motor M. Therefore, the folding vehicle 1 reduces burdens on a caregiver of the wheelchair 101.

Further, the folding vehicle 1 can self-travel by the battery 14 and the in-wheel motor M in the independent state in which the folding vehicle 1 is not coupled to the wheelchair 101. Therefore, the folding vehicle 1 can contribute to cost reduction by being used as a self-travelling vehicle unrelated to the wheelchair 101.

In the folding vehicle 1, the rear wheels 102 of the wheelchair 101 are separated from the running surface G when the cross pipe 104 or the coupling pipe 105 of the wheelchair 101 is mounted on the recessed part 63 of the first coupling member 61. Therefore, since the rotation of the rear wheels 102 of the wheelchair 101 are unneeded at the time of moving the wheelchair 101 by self-travelling of the battery 14 and the in-wheel motor M, safety is ensured.

The recessed part 72 of the second coupling member 71 is the same as the above in this regard.

In the folding vehicle 1, when the driving state is set in the standing driving mode, the second coupling member 71 becomes closer to the running surface G, the second coupling member 71 is erected between the pair of rear wheels 20, 20 and the recessed part 72 is positioned on the upper side of the second coupling member 71. Therefore, the cross pipe 104 or the coupling pipe 105 of the wheelchair 101 becomes easy to mount on the recessed part 72 of the second coupling member 71 and the burdens on the caregiver of the wheelchair 101 are further reduced.

The recessed part 63 of the first coupling member 61 is the same as the above in this regard.

In the folding vehicle 1, when the push-handle 103 of the wheelchair 101 is fixed to the handle 4 by the third coupling member 81, a moving operation of the wheelchair 101 is performed by an operation of the handle 4 for self-traveling of the battery 14 and the in-wheel motor M. At that time, the folding vehicle 1 can move the wheelchair 101 in any one of the seated driving mode illustrated in FIG. 21, the folded mode illustrated in FIG. 22, and the standing driving mode illustrated in FIG. 23.

Figure 22:
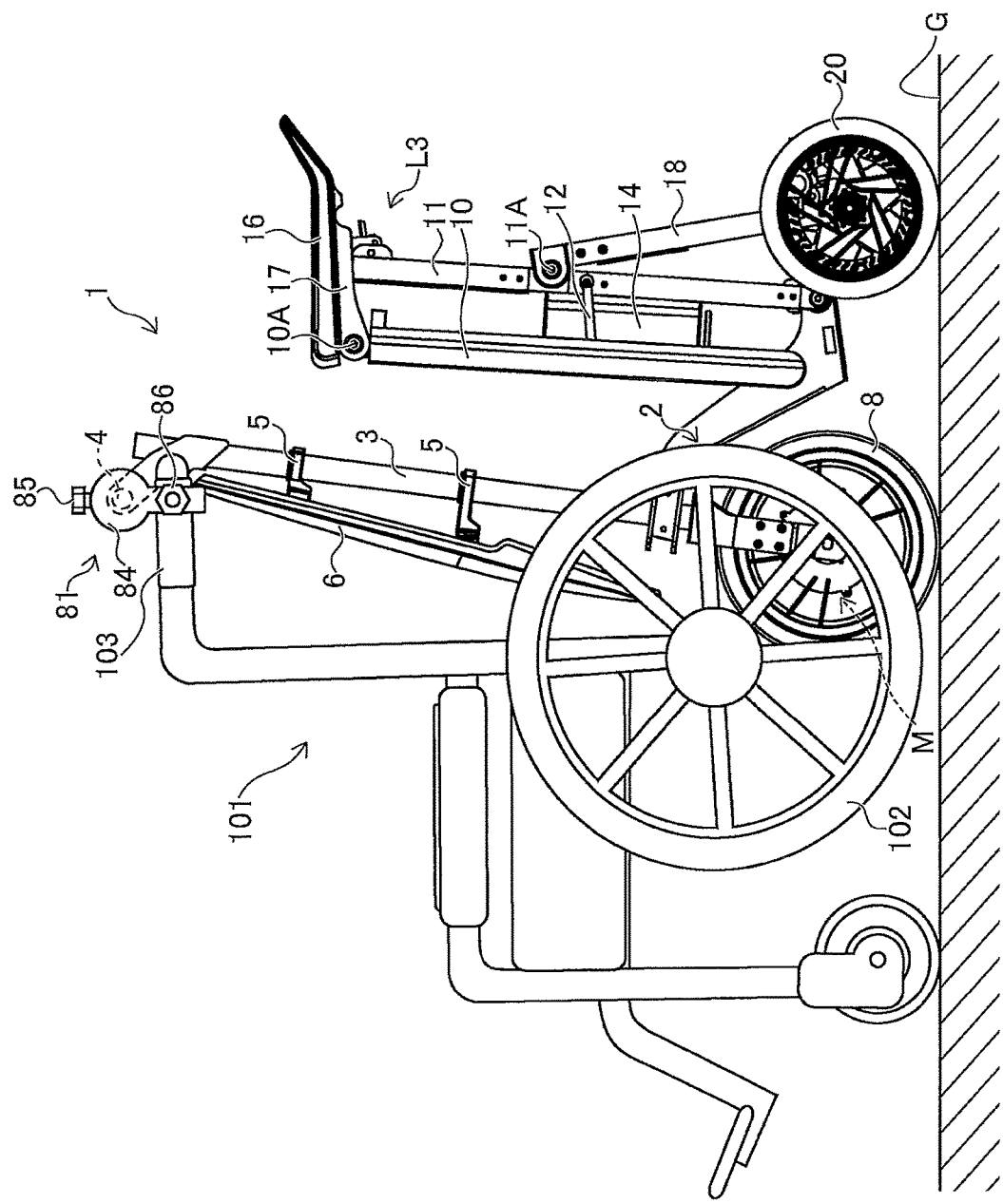
FIG. 22 is a side view of the folding vehicle set in the folded mode and coupled to the wheelchair by the third coupling member.
Figure 23:
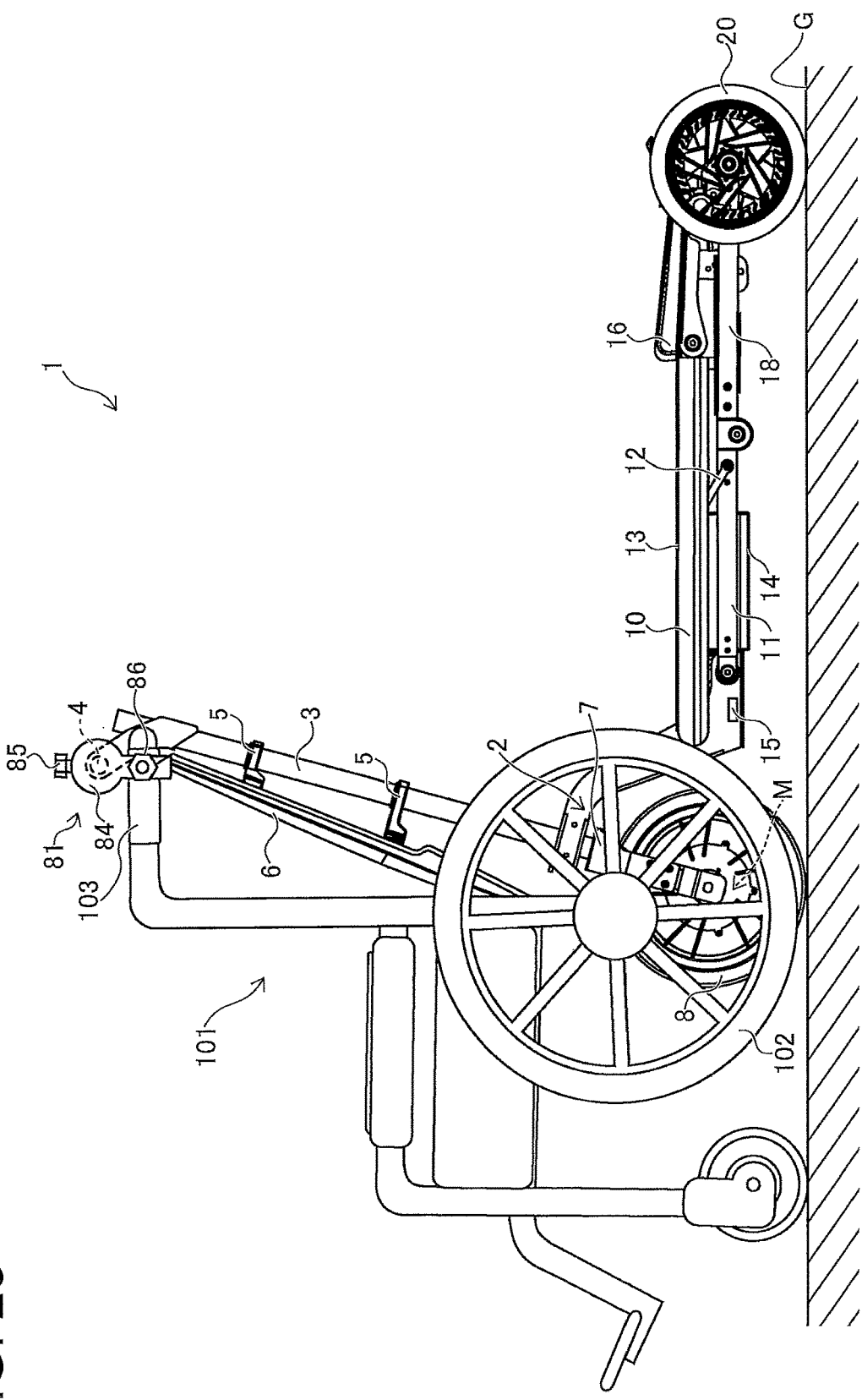
FIG. 23 is a side view of the folding vehicle set in the standing driving mode and coupled to the wheelchair by the third coupling member.

Since the size of the folding vehicle 1 is small in the folded mode illustrated in FIG. 22, it becomes easy to move the wheelchair 101 by the folding vehicle 1 in a narrow space such as the interior of a room. Further, since the seat 16 and the handle 4 are close to each other and the caregiver who is a driver of the folding vehicle 1 and a passenger of the wheelchair 101 are positioned closer to each other in the folded mode illustrated in FIG. 22, communication becomes easier between them, and their affinity is improved.

4. Modification

The present disclosure is not limited to embodiments as described above, and the various changes, substitutions, and alterations could be made hereto without departing from the spirit and scope of the disclosure.

For example, in the present embodiment, the first coupling member 61 or the second coupling member 71 may be provided in a self-travelling type small-sized electric vehicle that is set only in the standing driving mode.

The third coupling member 81 may be provided in a self-traveling type small-sized electric vehicle that is set in any one of the folded mode, the seated driving mode, and the standing driving mode.

In the present embodiment, a mounting member may be provided in the folding vehicle 1 instead of the first coupling member 61, the second coupling member 71, and the third coupling member 81. The above-mentioned mounting member is for coupling the wheelchair 101 to the folding vehicle 1, and for example, a boss (protrusion), a pin, a belt, a hook, or a clamp etc.

In the present embodiment, when a brake lever provided in the handle 4 is moved, the folding vehicle 1 may comprise an interlocking mechanism for moving a brake lever for care provided in the push-handle 103 of the wheelchair 101. In such a case, a braking operation in the brake lever for care of the wheelchair 101 is performed by a braking operation in the brake lever of the handle 4.

In the present embodiment, a drive source of the folding vehicle 1 is not limited to the in-wheel motor M. The other motors may be accepted as long as the motor is a motor driven by the battery 14.

The following description is the list of aspects of the embodiments of the present application.

The first small-sized electric vehicle is a small-sized electric vehicle including an electric mechanism that is capable of making the small-sized electric vehicle alone self-travel; and a coupling member that is coupled a wheelchair to the small-sized electric vehicle.

The second small-sized electric vehicle is the first small-sized electric vehicle including a mounting member that is mounted the wheelchair on the small-sized electric vehicle, as the coupling member.

The third small-sized electric vehicle is the second small-sized electric vehicle including a receiving member that is provided with a recessed part on which a component member of the wheelchair is mounted, as the mounting member, wherein when the component member of the wheelchair is mounted on the recessed part of the receiving member, rear wheels of the wheelchair are separated from a running surface.

The fourth small-sized electric vehicle is the third small-sized electric vehicle including a main frame; a board that is attached to the main frame; a seat that is mounted on an upper end portion of the main frame; and a swing arm, the swing arm including: one end pivotally that is supported by the main frame; and another end at which a pair of rear wheels is pivotally supported, wherein the small-sized electric vehicle is switchable between a first seated driving mode, in which driving while being seated on the seat is enable and a standing driving mode, in which driving while standing on the board positioned nearly parallel to the running surface along with the seat is enable, achieved by pivoting the main frame toward the swing atm in the first seated driving mode, and wherein when the first seated driving mode is switched to the standing driving mode, the receiving member is erected between the pair of rear wheels and the recessed part is positioned on an upper side of the receiving member.

The fifth small-sized electric vehicle is the fourth small-sized electric vehicle, wherein the receiving member is provided in the swing arm.

The sixth small-sized electric vehicle is the fourth small-sized electric vehicle, wherein the receiving member is provided in the seat.

The seventh small-sized electric vehicle is the first small-sized electric vehicle including a handle that operates self-traveling of the small-sized electric vehicle by the electric mechanism; and a joining member that fixes a push-handle of the wheelchair to the handle, as the coupling member.

The eighth small-sized electric vehicle is the seventh small-sized electric vehicle including a brake lever that is provided in the handle; and an interlocking mechanism that moves a brake lever for care provided in the push-handle of the wheelchair when the brake lever is moved.

The ninth small-sized electric vehicle is the seventh small-sized electric vehicle including a main frame; a board that is attached to the main frame; a seat that is mounted on an upper end portion of the main frame; and a swing arm, the swing arm including: one end that is pivotally supported by the main frame; and another end at which a pair of rear wheels is pivotally supported, wherein the small-sized electric vehicle is switchable between a first seated driving mode, in which driving while being seated on the seat is enable and a standing driving mode, in which driving while standing on the board positioned nearly parallel to a running surface along with the seat is enable, achieved by pivoting the main frame toward the swing arm in the first seated driving mode.

The tenth small-sized electric vehicle is the eighth small-sized electric vehicle including a main frame; a board that is attached to the main frame; a seat that is mounted on an upper end portion of the main frame; and a swing arm, the swing arm including: one end that is pivotally supported by the main frame; and another end at which a pair of rear wheels is pivotally supported, wherein the small-sized electric vehicle is switchable between a first seated driving mode, in which driving while being seated on the seat is enable and a standing driving mode, in which driving while standing on the board positioned nearly parallel to a running surface along with the seat is enable, achieved by pivoting the main frame toward the swing arm in the first seated driving mode.

The eleventh small-sized electric vehicle is the seventh small-sized electric vehicle including a front frame that is included an upper end to which the handle is attached; a base frame at which the front frame is pivotally supported; a main frame that is pivotally supported with respect to the base frame; and a seat that is mounted on an upper end portion of the main frame, wherein the small-sized electric vehicle is switchable between a first seated driving mode, in which driving while being seated on the seat is enable and a second seated driving mode, in which the seat and the handle are close to each other, achieved by pivoting the main frame toward the front frame in the first seated driving mode.

The twelfth small-sized electric vehicle is the eighth small-sized electric vehicle including a front frame that is included an upper end to which the handle is attached; a base frame at which the front frame is pivotally supported; a main frame that is pivotally supported with respect to the base frame; and a seat that is mounted on an upper end portion of the main frame, wherein the small-sized electric vehicle is switchable between a first seated driving mode, in which driving while being seated on the seat is enable and a second seated driving mode, in which the seat and the handle are close to each other, achieved by pivoting the main frame toward the front frame in the first seated driving mode.

The first small-sized electric vehicle can self-travel by the electric mechanism in an independent state in which the first small-sized electric vehicle is not coupled to the wheelchair. The first small-sized electric vehicle can self-move the wheelchair, to which is coupled the first small-sized electric vehicle via the coupling member, by self-traveling of the electric mechanism. Therefore, the first small-sized electric vehicle is capable of assisting power of the wheelchair coupled to the first small-sized electric vehicle and is capable of traveling alone in a state of being detached from the wheelchair.

The first small-sized electric vehicle can self-move the wheelchair, to which coupled is the first small-sized electric vehicle via the coupling member, by the electric mechanism. Therefore, the first small-sized electric vehicle reduces burdens on a caregiver of the wheelchair.

Further, the first small-sized electric vehicle can self-travel by the electric mechanism in the independent state in which the first small-sized electric vehicle is not coupled to the wheelchair. Therefore, the first small-sized electric vehicle can be used by not only aged people but also many people regardless of age or gender and contributes to cost reduction by being used as a self-travelling vehicle unrelated to the wheelchair.

The second small-sized electric vehicle can be coupled to the wheelchair by the mounting member for mounting the wheelchair.

In the third small-sized electric vehicle, the rear wheels of the wheelchair are separated from the running surface when the component member of the wheelchair is mounted on the recessed part of the receiving member. Therefore, since rotation of the rear wheels of the wheelchair are unneeded at the time of moving the wheelchair by the electric mechanism, safety is ensured.

In the fourth small-sized electric vehicle, when the first seated driving mode is switched to the standing driving mode in which driving while standing on the board positioned nearly parallel to the running surface along with the seat is enable, the receiving member is erected between the pair of rear wheels and the recessed part is positioned on the upper side of the receiving member. Therefore, the component member of the wheelchair becomes easy to mount on the recessed part of the receiving member and the burdens on the caregiver are further reduced.

In the fifth small-sized electric vehicle, providing the receiving member in the swing arm is realized that when the first seated driving mode is switched to the standing driving mode the receiving member is erected between the pair of rear wheels and the recessed part is positioned on the upper side of the receiving member.

In the sixth small-sized electric vehicle, providing the receiving member in the seat is realized that when the first seated driving mode is switched to the standing driving mode, the receiving member is erected between the pair of rear wheels and the recessed part is positioned on the upper side of the receiving member.

In the seventh small-sized electric vehicle, since the push-handle for the wheelchair is fixed to the handle by the joining member, a moving operation of the wheelchair is performed by an operation of the handle performed for self-travelling by the electric mechanism.

In the eighth small-sized electric vehicle, when the brake lever provided in the handle is moved, the brake lever for care provided in the push-handle of the wheelchair is moved by the interlocking mechanism. Therefore, a braking operation of the brake lever for care of the wheelchair is performed by a braking operation of the brake lever of the handle.

In the ninth small-sized electric vehicle or the tenth small-sized electric vehicle, the wheelchair can be moved in the first seated driving mode, in which driving while being seated on the seat is enable or in the standing driving mode, in which driving while standing on the board positioned nearly parallel to the running surface along with the seat is enable.

In the eleventh small-sized electric vehicle or the twelfth small-sized electric vehicle, the wheelchair can be moved in the first seated driving mode, in which driving while being seated on the seat is enable or in the second seated driving mode, in which the seat and the handle are close to each other.

When the driving state of the eleventh small-sized electric vehicle or the twelfth small-sized electric vehicle is switched to the second seated driving mode, the size of the eleventh small-sized electric vehicle or the twelfth small-sized electric vehicle becomes small by the seat and the handle becoming close to each other. Therefore, it becomes easy to move the wheelchair in a narrow space such as the interior of a room.

Further, in the eleventh small-sized electric vehicle or the twelfth small-sized electric vehicle, when the driving state of the eleventh small-sized electric vehicle or the twelfth small-sized electric vehicle is switched to the second seated driving mode, the seat and the handle are close to each other. Therefore, a passenger of the wheelchair is positioned closer to the caregiver, communication becomes easier between them, and their affinity is improved.

In the present embodiment, the folding vehicle 1 is an example of the "small-sized electric vehicle". The main frame mechanism 9 is an example of the "main frame". The battery 14 and the in-wheel motor M are an example of the "electric mechanism". The seated driving mode is an example of the "first seated driving mode". The folded mode is an example of the "second seated driving mode". The first coupling member 61 is an example of the "coupling member", the "mounting member", and the "receiving member". The second coupling member 71 is an example of the "coupling member", the "mounting member" and the "receiving member". The third coupling member 81 is an example of the "coupling member", the "mounting member", and the "joining member". The cross pipe 104 of the wheelchair 101 is an example of the "component member of the wheelchair". The coupling pipe 105 of the wheelchair 101 is an example of the "component member of the wheelchair".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A small-sized electric vehicle comprising:
   an electric mechanism that is capable of making the small-sized electric vehicle alone self-travel;
   a coupling member that is coupled a wheelchair to the small-sized electric vehicle;
   a mounting member that is mounted the wheelchair on the small-sized electric vehicle, as the coupling member; and
   a receiving member that is provided with a recessed part on which a component member of the wheelchair is mounted, as the mounting member, wherein when the component member of the wheelchair is mounted on the recessed part of the receiving member, rear wheels of the wheelchair are separated from a running surface.

2. The small-sized electric vehicle according to claim 1 comprising:
   a main frame;
   a board that is attached to the main frame;
   a seat that is mounted on an upper end portion of the main frame; and
   a swing arm, the swing arm including:
      one end pivotally that is supported by the main frame; and
      another end at which a pair of rear wheels is pivotally supported, wherein
   the small-sized electric vehicle is switchable between a first seated driving mode, in which driving while being seated on the seat is enable and a standing driving mode, in which driving while standing on the board positioned nearly parallel to the running surface along with the seat is enable, achieved by pivoting the main frame toward the swing arm in the first seated driving mode, and wherein
   when the first seated driving mode is switched to the standing driving mode, the receiving member is erected between the pair of rear wheels and the recessed part is positioned on an upper side of the receiving member.

3. The small-sized electric vehicle according to claim 2, wherein the receiving member is provided in the swing arm.

4. The small-sized electric vehicle according to claim 2, wherein the receiving member is provided in the seat.

5. The small-sized electric vehicle according to claim 1 comprising:
   a handle that operates self-traveling of the small-sized electric vehicle by the electric mechanism; and
   a joining member that fixes a push-handle of the wheelchair to the handle, as the coupling member.

6. The small sized electric vehicle according to claim 5 comprising:
   a brake lever that is provided in the handle; and
   an interlocking mechanism that moves a brake lever for care provided in the push-handle of the wheelchair when the brake lever is moved.

7. The small-sized electric vehicle according to claim 6 comprising:
   a main frame;
   a board that is attached to the main frame;
   a seat that is mounted on an upper end portion of the main frame; and
   a swing arm, the swing arm including:
      one end that is pivotally supported by the main frame; and
      another end at which a pair of rear wheels is pivotally supported, wherein
   the small-sized electric vehicle is switchable between a first seated driving mode, in which driving while being seated on the seat is enable and a standing driving mode, in which driving while standing on the board positioned nearly parallel to a running surface along with the seat is enable, achieved by pivoting the main frame toward the swing arm in the first seated driving mode.

8. The small-sized electric vehicle according to claim 6 comprising:
   a front frame that is included an upper end to which the handle is attached;
   a base frame at which the front frame is pivotally supported;
   a main frame that is pivotally supported with respect to the base frame; and
   a seat that is mounted on an upper end portion of the main frame, wherein
   the small-sized electric vehicle is switchable between a first seated driving mode, in which driving while being seated on the seat is enable and a second seated driving mode, in which the seat and the handle are close to each other, achieved by pivoting the main frame toward the front frame in the first seated driving mode.

9. The small-sized electric vehicle according to claim 5 comprising:
   a main frame;
   a board that is attached to the main frame;
   a seat that is mounted on an upper end portion of the main frame; and
   a swing arm, the swing arm including:
      one end that is pivotally supported by the main frame; and
      another end at which a pair of rear wheels is pivotally supported, wherein
   the small-sized electric vehicle is switchable between a first seated driving mode, in which driving while being seated on the seat is enable and a standing driving mode, in which driving while standing on the board positioned nearly parallel to a running surface along with the seat is enable, achieved by pivoting the main frame toward the swing arm in the first seated driving mode.

10. The small-sized electric vehicle according to claim 5 comprising:
    a front frame that is included an upper end to which the handle is attached;
    a base frame at which the front frame is pivotally supported;
    a main frame that is pivotally supported with respect to the base frame; and
    a seat that is mounted on an upper end portion of the main frame, wherein
    the small-sized electric vehicle is switchable between a first seated driving mode, in which driving while being seated on the seat is enable and a second seated driving mode, in which the seat and the handle are close to each other, achieved by pivoting the main frame toward the front frame in the first seated driving mode.

* * * * *